(12) United States Patent
Kamata et al.

(10) Patent No.: US 11,158,195 B2
(45) Date of Patent: Oct. 26, 2021

(54) PLATOONING MANAGEMENT SYSTEM

(71) Applicant: Toyota Jidosha Kabushiki Kaisha, Toyota (JP)

(72) Inventors: Nobuhide Kamata, Susono (JP); Eiji Sakaguchi, Shizuoka-ken (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/711,825

(22) Filed: Dec. 12, 2019

(65) Prior Publication Data

US 2020/0193839 A1    Jun. 18, 2020

(30) Foreign Application Priority Data

Dec. 13, 2018  (JP) .............................. JP2018-233367

(51) Int. Cl.
```
G08G 1/00      (2006.01)
G06F 3/0488    (2013.01)
G06F 3/0482    (2013.01)
H04W 4/46      (2018.01)
```

(52) U.S. Cl.
CPC ............. *G08G 1/22* (2013.01); *G06F 3/0482* (2013.01); *G06F 3/0488* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 2018/0190128 A1* | 7/2018 | Saigusa | B60W 40/04 |
| 2018/0211546 A1* | 7/2018 | Smartt | H04W 12/04 |
| 2019/0079540 A1* | 3/2019 | Yoon | G05D 1/0276 |

FOREIGN PATENT DOCUMENTS

| | | |
|---|---|---|
| JP | 2008-204094 A | 9/2008 |
| JP | 2012-238169 A | 12/2012 |
| JP | 2016-128997 A | 7/2016 |

* cited by examiner

*Primary Examiner* — Thomas S McCormack
(74) *Attorney, Agent, or Firm* — Dinsmore & Shohl LLP

(57) ABSTRACT

The platooning management system organizes a platoon for performing platooning by electronically connecting vehicle-to-vehicle of a plurality of vehicles. The system is configured to include a list presentation process for presenting a list including information of active vehicles corresponding to platooning travel by electronic connection among target vehicles stopped in a target area, an acceptance process for accepting designated platoon candidate vehicles and their platoon order for platooning travel from among active vehicles, a determination process for determining suitability of a designated platoon organized according to the platoon candidate vehicle and the platoon order to the platooning travel, and an output process for outputting a determination result determined by the determination process.

13 Claims, 18 Drawing Sheets

| VEHICLE | ACTIVE/ INACTIVE | DRIVING SUPPORT LEVEL | DRIVER BOARDING STATUS | CLASS | PLATOON DESIGNATION |
|---|---|---|---|---|---|
| 1A | ACTIVE | LV-4 | NO | L | |
| 1B | INACTIVE | LV-2 | YES | M | |
| 1C | ACTIVE | LV-3 | YES | M | |
| 1D | ACTIVE | LV-3 | NO | S | |
| 1E | INACTIVE | LV-1 | YES | L | |
| 1F | ACTIVE | LV-2 | YES | LL | |
| 1G | ACTIVE | LV-4 | NO | M | |

[SUITABLE IMAGE]

| | VEHICLE | ACTIVE/ INACTIVE | DRIVING SUPPORT LEVEL | DRIVER BOARDING STATUS | CLASS | PLATOON DESIGNATION |
|---|---|---|---|---|---|---|
| OK | 1A | ACTIVE | LV-4 | NO | L | N-2 |
| | 1B | INACTIVE | LV-2 | YES | M | |
| | 1C | ACTIVE | LV-3 | YES | M | |
| | 1D | ACTIVE | LV-3 | NO | S | |
| | 1E | INACTIVE | LV-1 | YES | L | |
| OK | 1F | ACTIVE | LV-2 | YES | LL | N-1 |
| OK | 1G | ACTIVE | LV-4 | NO | M | N-3 |

[UNSUITABLE IMAGE]    186B

| | VEHICLE | ACTIVE/ INACTIVE | DRIVING SUPPORT LEVEL | DRIVER BOARDING STATUS | CLASS | PLATOON DESIGNATION |
|---|---|---|---|---|---|---|
| OK | 1A | ACTIVE | LV-4 | NO | L | N-3 |
| | 1B | INACTIVE | LV-2 | YES | M | |
| | 1C | ACTIVE | LV-3 | YES | M | |
| | 1D | ACTIVE | LV-3 | NO | S | |
| | 1E | INACTIVE | LV-1 | YES | L | |
| NG | 1F | ACTIVE | LV-2 | YES | LL | N-1 |
| OK | 1G | ACTIVE | LV-4 | NO | M | N-2 |

[SUITABLE IMAGE]

DESIGNATED PLATOON IS SUITED FOR PLATOONING TRAVEL.

PLATOONING MANAGEMENT SYSTEM

CROSS-REFERENCE TO RELATED APPLICATION

The present application is based on, and claims priority from, Japanese Patent Application Serial Number 2018-233367, filed on Dec. 13, 2018, the disclosure of which is hereby incorporated by reference herein in its entirety.

FIELD

The present disclosure relates to a platooning management system, and more particularly, to a platooning management system for organizing a platoon for performing platooning by electronically connecting vehicle-to-vehicle of a plurality of vehicles.

BACKGROUND

A platooning technique called electronic traction is known, in which a platoon is formed and traveled by electronically connecting a plurality of vehicles arranged in a row. In the electronic traction, since the platoon is maintained while data is shared between the vehicles arranged in the row, it is possible to shorten the gap distance between the vehicles, thereby obtaining the effect of improving the fuel efficiency performance by improving the aerodynamic characteristics, and the like. Japanese Patent Laid-Open No. 2016-128997 discloses a technique related to such an electronic traction. Specifically, in the apparatus of Japanese Patent Laid-Open No. 2016-128997, when there is the same travel section in the scheduled travel route of the own vehicle and the scheduled travel route of other vehicles, platooning travel of these vehicles is performed.

SUMMARY

Here, a case will be considered in which a vehicle for platooning travel and its platoon order are designated by a person outside from among a plurality of target vehicles. It is assumed that vehicles having different levels of driving support control, vehicles without a driver, vehicles having different stopping positions, and the like are mixed in the target vehicles. In order to organize a suitable platoon designation from among the target vehicles having different conditions, it is important to easily inform a designating person of these conditions or whether or not the platoon should be organized. In the above-mentioned technique, it is not assumed that vehicles for platooning travel and their platoon order are designated from outside.

The present disclosure has been made in view of the above-mentioned problems, and an object thereof is to provide a platooning management system capable of designating an organization of a platoon suitable for platooning travel by electronic connection from among a plurality of target vehicles.

In order to solve the above-mentioned problems, the first disclosure is applied for a platooning management system for organizing a platoon for platooning travel by electronically connecting vehicle-to-vehicle of a plurality of vehicles. The platooning management system includes a processor to execute a program for organizing the platoon, and a memory to store the program. The program includes a list presentation process, an acceptance process, a determination process, and an output process. The list presentation process presents a list including information of vehicles corresponding to platooning travel by electronic concatenation among target vehicles stopped in a target area. The acceptance process accepts designation of a platoon candidate vehicle and a platoon order for performing the platooning travel in a state in which the list is presented. The determination process determines a suitability of a designated platoon organized according to the platoon candidate vehicle and the platoon order to the platooning travel. The output process outputs a determination result determined by the determination process.

A second disclosure has the following further features in the first disclosure.

The determination process includes a perimeter monitoring range identification process for identifying a perimeter monitoring range of the designated platoon monitored by a sensor group mounted on the platoon candidate vehicle. The determination process is configured to determine suitability of the designated platoon based on the perimeter monitoring range.

A third disclosure further has the following features in the second disclosure.

The list presentation process is configured to display an image including the perimeter monitoring range on a display device.

A fourth disclosure has the following features in any one of the first to third disclosures. The determination process includes stop position information acquisition process for acquiring stop position information of the target vehicles. The determination process is configured to determine the suitability of the designated platoon based on the stop position information.

A fifth disclosure has the following features in the fourth disclosure.

The list presentation process is configured to display an image including the stop position information on a display device.

A sixth disclosure has the following features in the second or third disclosure.

The output process is configured to display an image in which the determination result is associated with an image including the perimeter monitoring range on a display device.

A seventh disclosure has the following features in the fourth or fifth disclosure. The output process is configured to display an image in which the determination result is associated with an image including the stop position information on a display device.

An eighth disclosure has the following features in any one of the first to seventh disclosures.

The program includes a parking mode setting process for setting a parking mode of the designated platoon in an arrival area, and a parking process for parking the designated platoon according to the parking mode.

In order to solve the above-mentioned problems, a ninth disclosure is applied to a platooning management system for organizing a platoon for platooning travel by electronically connecting vehicle-to-vehicle of a plurality of vehicles. The platooning management system includes a human machine interface unit for organizing the platoon. The human machine interface unit includes an input device for accepting designation of a platoon candidate vehicle and a platoon order for performing platooning travel, and an output device for outputting a result of suitability of a designated platoon organized according to the platoon candidate vehicle and the platoon order to the platooning travel.

A tenth disclosure has the following features in the ninth disclosure.

The output device is configured to display a list including information of active vehicles corresponding to the platooning travel by electronic connection, among target vehicles stopped in a target area. In addition, the input device is configured to accept designation of the platoon candidate vehicle and the platoon order, in a state where the list is displayed on the output device.

An eleventh disclosure has the following features in the tenth disclosure.

The human machine interface unit includes a touch panel in which the input device and the output device are integrally formed.

A twelfth disclosure has the following features in the tenth or eleventh disclosure.

The list is an image including stop position information of the target vehicles.

A thirteenth disclosure has the following features in any one of the tenth to twelfth disclosures.

The list is an image including information of a perimeter monitoring range of the designated platoon monitored by a sensor group mounted on the platoon candidate vehicle.

A fourteenth disclosure has the following features in any one of the ninth to thirteenth disclosures.

The output device is configured to display an image in which the suitability result is associated with an image including information of a perimeter monitoring range of the designated platoon monitored by a sensor group mounted on the platoon candidate vehicle.

A fifteenth disclosure has the following features in any one of the ninth to fourteenth disclosures.

The output device is configured to display an image in which the suitability result is associated with an image including stop position information of the platoon candidate vehicle.

A sixteenth disclosure has the following features in any one of the tenth to fifteenth disclosures.

The human machine interface unit is mounted on a vehicle on which a driver is on board among target vehicles stopped in the target area.

According to the first disclosure, the designator can designate the platoon candidate vehicle and the platoon order to perform the platooning travel while confirming the presentation of the list including the information of the vehicle corresponding to the platoon by the electronic connection. In addition, the designator can receive feedback of the determination result regarding the suitability of the designated platoon to the platooning travel. As described above, according to the present disclosure, since the convenience in specifying the platoon candidate vehicle and the platoon order is improved, it is possible to specify the organization of the platoon suitable for the platooning travel.

According to the second disclosure, suitability of the designated platoon is determined based on the perimeter monitoring range of the designated platoon. As a result, it is possible to organize platoon with high driving safety.

According to the third disclosure, in the list presentation process, an image including the perimeter monitoring range is displayed on the display device. As a result, it is possible to designate the platoon candidate vehicle and the platoon order while visually checking the perimeter monitoring range.

According to the fourth disclosure, the suitability of the designated platoon is determined based on the stop position information of the target vehicles. As a result, it is possible to organize a platoon that can smoothly perform electronic coupling.

According to the fifth disclosure, in the list presentation process, an image including the stop position information is displayed on the display device. This makes it possible to specify the platoon candidate vehicle and the platoon order while visually checking the stop position information.

According to the sixth disclosure, an image in which the determination result is associated with the image including the perimeter monitoring range is displayed on the display device. This makes it possible to visually confirm the determination result from the viewpoint of the perimeter monitoring range.

According to the seventh disclosure, an image in which the determination result is associated with the image including the vehicle stop information is displayed on the display device. This makes it possible to visually confirm the determination result from the viewpoint of the vehicle stop information.

According to the eighth disclosure, when parking the designated platoon in the arrival area, the parking mode is set based on the relationship between the shape of the arrival area and the length of the designated platoon. This makes it possible to optimize the parking operation according to the shape of the arrival area.

According to the ninth disclosure, the designator can designate the platoon candidate vehicle and the platoon order for the platooning travel from the input device of the human machine interface unit. In addition, the designator can receive feedback of the suitability result of the designated platoon from the output device of the human machine interface unit.

According to the tenth disclosure, the designator can designate the platoon candidate vehicle and the platoon order to perform the platooning travel while checking the display of the list including the information of the vehicle corresponding to the platooning travel by the electronic connection.

According to an eleventh disclosure, the human-machine interface unit includes a touch panel. As a result, the designator can directly designate the platoon candidate vehicle and the platoon order by the operation of touching the display of the list.

According to the twelfth disclosure, it is possible to designate the platoon candidate vehicle and the platoon order for performing the platooning travel while checking the display of the stop position information of the target vehicles.

According to the thirteenth disclosure, it is possible to designate the platoon candidate vehicle and the platoon order to perform the platooning travel while checking the display of the perimeter monitoring range of the target vehicles.

According to the fourteenth disclosure, it is possible to receive feedback of an image in which a determination result is associated with an image including a perimeter monitoring range. This makes it possible to visually confirm the determination result from the viewpoint of the perimeter monitoring range.

According to the fifteenth disclosure, it is possible to receive image feedback in which a determination result is associated with an image including vehicle stop information. This makes it possible to visually confirm the determination result from the viewpoint of the vehicle stop information.

According to the sixteenth disclosure, it is possible for a driver on board to designate the platoon candidate vehicle and the platoon order for platooning travel by operating a human machine interface unit from the inside of the vehicle.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

First Embodiment

1. Driving Support Control

A platooning system 100 of the present embodiment includes a plurality of vehicles 1 that perform platooning travel. Each vehicle 1 has a function for performing driving support control. Here, before the description of the platooning system 100, an outline of the driving support control of the vehicle 1 will be described first.

Figure 1:
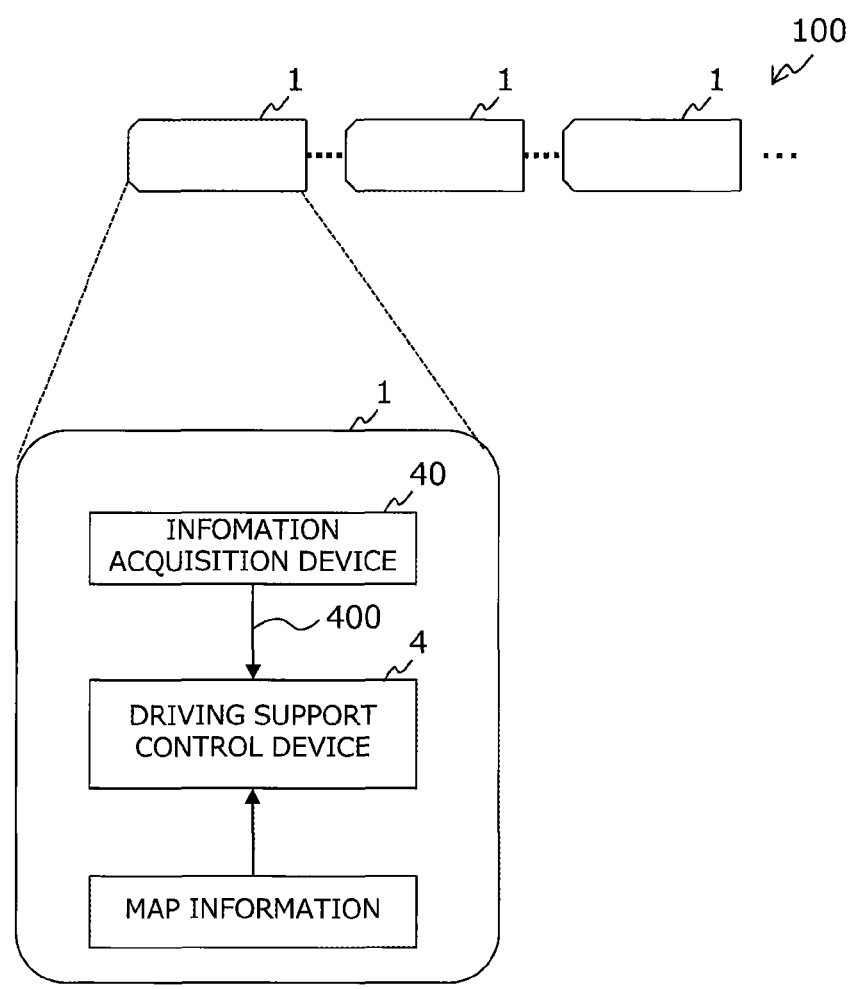
FIG. 1 is a conceptual diagram for explaining a function related to travel support control of a vehicle applied to a platooning system according to a first embodiment.

FIG. 1 is a conceptual diagram for explaining a function related to travel support control of a vehicle applied to a platooning system according to the present embodiment. The vehicle 1 is equipped with an information acquisition device 40 and a driving support control device (driving support controller) 4.

The information acquisition device 40 acquires various types of information using sensors mounted on the vehicle 1. The information acquired by the sensor mounted on the vehicle 1 includes information indicating the driving environment of the vehicle 1. In the following description, this information is referred to as "driving environment information 400". The driving environment information 400 includes vehicle position information indicating a position of the vehicle 1, vehicle state information indicating a state of the vehicle 1, surrounding situation information indicating the surrounding situation of the vehicle 1, and the like.

The driving support control device 4 performs driving support control for supporting the driving of the vehicle 1 based on the driving environment information 400. More specifically, the driving support control includes at least one of steering control, acceleration control, and deceleration control. Examples of such driving support control include autonomous driving control, path-following control, Lane Departure Alert (LDA), Pre-Collision System (PCS), Adaptive Cruise Control (ACC), and the like.

In the driving support control, map information is used. The map information includes various information associated with positions. The position is an absolute position and is defined in an absolute coordinate system (latitude, longitude, altitude). The map information is not limited to general road maps or navigation maps, and may include map information of various viewpoints. For example, the map information may include the position of a stationary object on a road, such as a guardrail, a wall, or the like, and a characteristic object, such as a road surface, a white line, a pole, a signboard, or the like.

In the present embodiment, the driving support control is classified into a plurality of levels. In the present embodiment, the driving support control is classified into a plurality of levels. In the following description, the level of the driving support control is referred to as "driving support level". The plurality of driving support levels can be compared with each other. The higher the driving support level, the more the driving support control device 4 is responsible for driving operations (driving tasks). It can be said that the driving support level represents the degree (delegation degree) to which the driver delegates the operation of the vehicle 1 to the driving support control device 4.

Driving support levels are lowest in LV-1 and highest in LV-5. For example, the content of the driving support levels LV-1 to LV-5 is as follows.

LV-1: The driving support control device performs subtasks of the driving tasks relating to either the steering control or the acceleration/deceleration control. For example, limited driving support control using ACC (Adaptive Cruise Control), path-following control, or the like is applicable.

LV-2: The driving support control device performs subtasks of the driving tasks related to both steering control and acceleration/deceleration control. For example, driving support control for simultaneously performing a plurality of controls such as adaptive cruise control (ACC) and path-following control is applicable.

LV-3: In a limited driving support feasible area, the driving support control device performs all driving tasks related to steering control and acceleration/deceleration control. The driver may take his hand off the steering. However, the driver is required to monitor the surroundings of the vehicle 1. The driver performs manual operation as necessary.

LV-4: In a limited driving support feasible area, the driving support control device performs all driving tasks related to steering control and acceleration/deceleration control. A driver does not have to monitor the surrounding conditions of the vehicle 1. The driver is allowed to perform other operations (second tasks). In an emergency, the driving support control device requests the driver to start manual driving. However, the driver is not expected to respond to the requirement.

In all areas, the driving support control device performs all driving tasks related to steering control and acceleration/deceleration control. A driver does not have to monitor the surrounding conditions of the vehicle 1. The driver is allowed to perform other operations (second tasks). In an emergency, the driving support control device automatically retracts the vehicle to a safe location.

In this class of operation support levels, the driver performs some of the driving tasks in LV-1 and LV-2, while the driving support control device performs all of the driving tasks in LV-3 to LV-5. The classification of the driving support level is not limited to that described above. For example, each driving support level may be hierarchized more finely. In addition, the classification of the driving support level may coincide with the classification of a typical auto driving level based on J3016 issued by SAE (Society of Automotive Engineers).

Further, the driving support control device 4 generates a travel plan of the vehicle 1 based on the map information and the driving environment information 400. The travel plan includes a target route to a destination and a local target trajectory (a target trajectory in a lane and a target trajectory for lane change). The travel plan includes a vehicle travel plan for following a target trajectory, following a traffic rule, and avoiding an obstacle, and the like. The driving support control device 4 executes driving support control so that the vehicle 1 travels in accordance with the travel plan.

2. Summary of Platooning System

Figure 2:
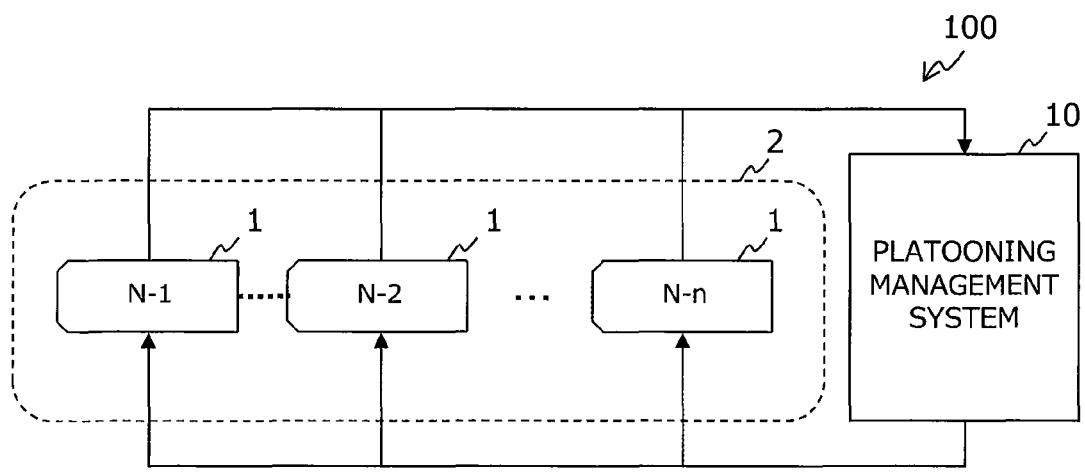
FIG. 2 is a diagram schematically showing a configuration of the platooning system according to the first embodiment.

FIG. 2 is a diagram schematically showing a configuration of a platooning system according to the present embodiment. The platooning system 100 is a system that performs platooning travel using electronic connection. The electronic connection indicates that a plurality of vehicles 1 positioned in a row are electrically connected to each other by wireless communication. In the following description, a plurality of vehicles 1 that are electronically connected are referred to as "vehicle group 2". Also, the order of the vehicles of the vehicle group 2 will be denoted as "N-1", "N-2", . . . , "N-n" in order from the head side.

The platooning system 100 includes a vehicle group 2 including a plurality of vehicles 1, and a platooning management system (platooning manager) 10. The number of vehicles 1 constituting the vehicle group 2 is not limited. The kind of the plurality of vehicles 1 constituting the vehicle group 2 is not limited as long as it is a vehicle on which the above-mentioned driving support control device 4 is mounted. Also, the driving support levels that can be implemented in the driving support control devices 4 of the respective vehicles 1 need not be the same. For example, in the vehicle group 2, a vehicle 1 capable of LV-3 driving support control and a vehicle 1 capable of LV-2 driving support control may coexist. Further, there is no particular limitation on whether or not the driver boards each of the plurality of vehicles 1 constituting the vehicle group 2. For example, the vehicle group 2 may include the vehicle 1 in LV-4 where the driver is not on board and the other vehicle 1 in LV-2 where the driver is on board.

The platooning management system 10 sets a platoon of the vehicle group 2 in which the plurality of vehicles 1 are electronically connected, and controls the platooning travel of the vehicle group 2. The platooning management system 10 is mounted on an external device such as a management server existing outside, for example. As another example, the platooning management system 10 may be a vehicle-mounted device mounted on any vehicle 1 included in the vehicle group 2. A formation process executed by the platooning management system 10 will be described in detail later. The platooning management system 10 transmits vehicle group information for organizing the designated platoon to each vehicle 1 of the vehicle group 2. Each vehicle 1 of the vehicle group 2 identifies the vehicle 1 included in the vehicle group 2 based on the received vehicle group information, and performs electronic connection between the vehicles. Hereinafter, the configuration of the platooning system 100 will be described in more detail.

2-1. Configuration of Platooning System

Figure 3:
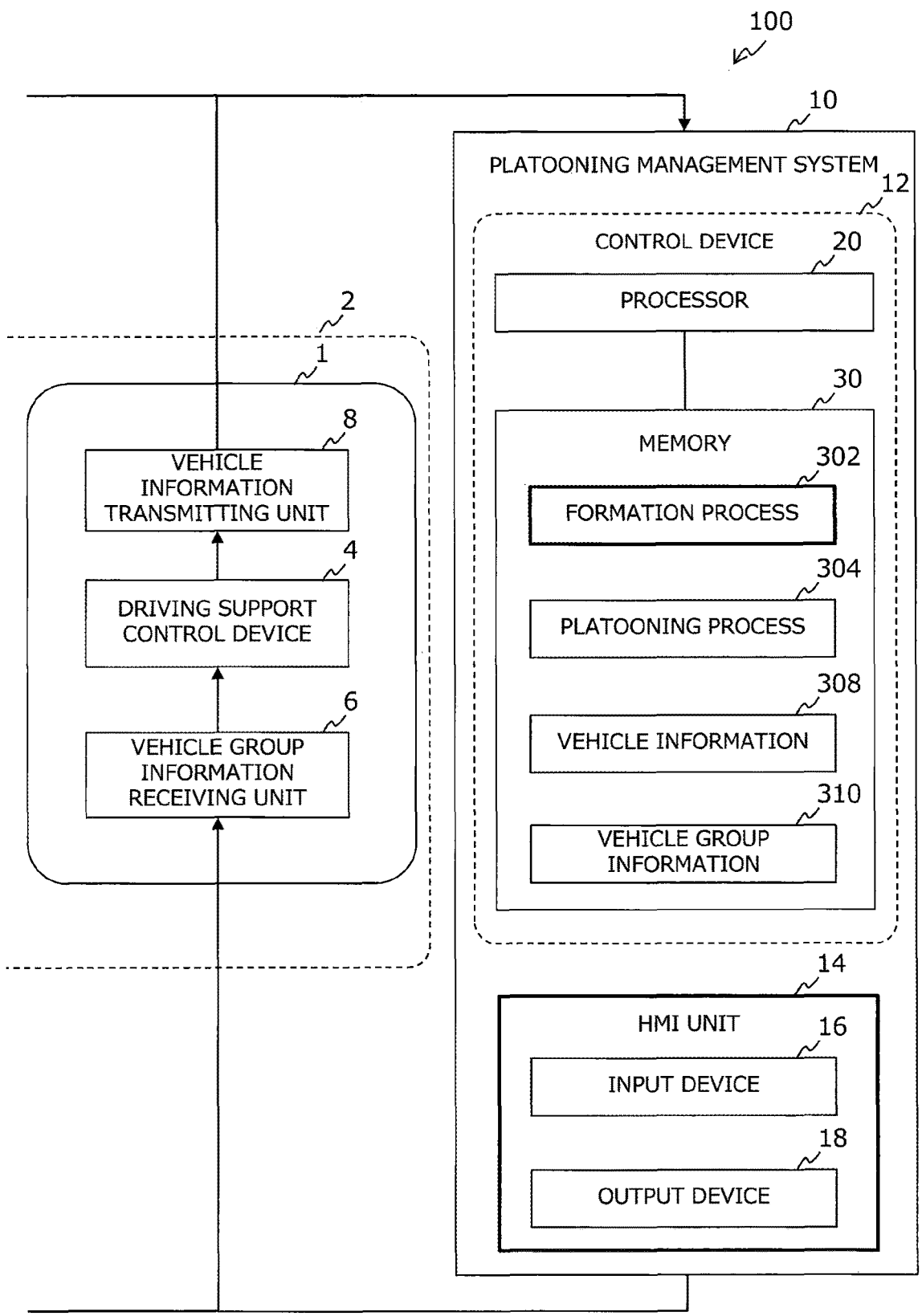
FIG. 3 is a block diagram showing an example of a configuration of the platooning system according to the first embodiment.

FIG. 3 is a block diagram showing an example of the configuration of the platooning system according to the first embodiment. As described above, the platooning system 100 includes the platooning management system 10 and the vehicle group 2. The vehicle group 2 is composed of a plurality of vehicles 1. In FIG. 3, only the configuration of one of the plurality of vehicles 1 is shown, but the other vehicles 1 are also provided with the same configuration.

The vehicle 1 includes the driving support control device 4, a vehicle group information receiving unit 6, and a vehicle information transmitting unit 8. The vehicle group information receiving unit 6 receives vehicle group information transmitted from the platooning management system 10. The driving support control device 4 performs electronic connection with the specified vehicle 1 based on the received vehicle group information, and performs driving support control of the vehicle 1. The vehicle information transmitting unit 8 transmits the vehicle information of the vehicle 1 to the platooning management system 10. The vehicle information includes the driving environment information 400 and the travel plan of the vehicle 1.

2-2. Configuration of Driving Support Control Device

Figure 4:
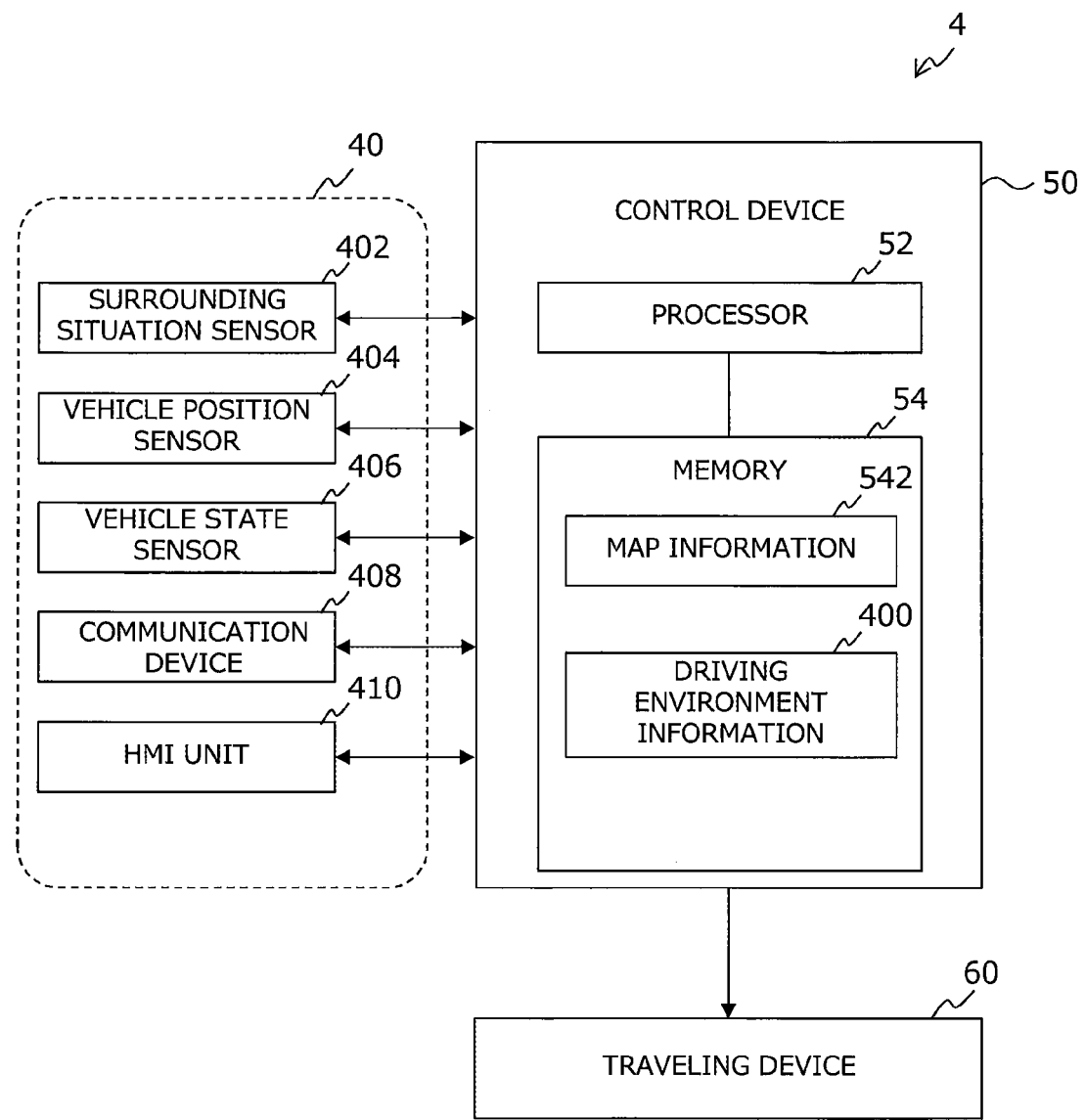
FIG. 4 is a block diagram showing a configuration example of a driving support control device of a vehicle applied to the platooning system according to the first embodiment.

FIG. 4 is a block diagram showing a configuration example of a driving support control device of a vehicle applied to the platooning system according to the present embodiment. The driving support control device 4 includes an information acquisition device 40, a control device (controller) 50, and a traveling device 60.

The information acquisition device 40 includes a surrounding situation sensor 402, a vehicle position sensor 404, a vehicle state sensor 406, a communication device 408, and an HMI (Human Machine Interface) unit 410. The surrounding situation sensor 402 recognizes (detects) a situation around the vehicle 1. Examples of the surrounding situation sensor 402 include a camera (image pickup apparatus), LIDAR (Laser Imaging Detection and Ranging), a radar, and the like. The camera takes an image of surrounding conditions of the vehicle 1. The rider detects a target object around the vehicle 1 by using a laser beam. The radar uses radio waves to detect the landmarks around the vehicle 1.

The vehicle position sensor 404 detects the position and orientation of the vehicle 1. For example, the vehicle position sensor 404 may include a GPS (Global Positioning System) sensor. The GPS sensor receives signals transmitted from a plurality of GPS satellites, and calculates the position and orientation of the vehicle 1 based on the received signals.

The vehicle state sensor 406 detects the state of the vehicle 1. The state of the vehicle 1 includes a speed, acceleration, a steering angle, a yaw rate, and the like of the vehicle 1. Further, the state of the vehicle 1 includes whether or not the driver is on board, and the driving operation of the driver. The driving operation includes an accelerator operation, a brake operation, and a steering operation of the vehicle 1.

The communication device 408 communicates with the vehicle and the outside. For example, the communication device 408 communicates with an external device of the vehicle 1 via a communication network. The external devices include the platooning management system 10 or a management center. The communication device 408 performs vehicle-to-vehicle communication (V2V communication) with other vehicles in the vicinity. Communication is performed between the vehicle and the outside. The communication device 408 may perform vehicle-to-roadside-infrastructure communication (V2I communication) with the surrounding infrastructure.

The HMI unit 410 is an interface for providing information to the driver and accepting information from the driver. Specifically, the HMI unit 410 includes an input device and an output device. Examples of the input device include a touch panel, a switch, and a microphone. Examples of the output device include a display device, a speaker, and the like.

The traveling device 60 includes a steering device, a driving device, and a braking device. The steering device steers wheels of the vehicle 1. The driving device is a driving source for generating a driving force of the vehicle 1. Examples of the driving device include an engine or an electric motor. The brake device generates a braking force on the vehicle 1.

The control device 50 is a microcomputer including a processor 52 and a memory 54. The control device 50 is also referred to as "ECU (Electronic Control Unit)". The processor 52 executes the program stored in the memory 54, thereby executing various processes by the control device 50.

For example, the control device 50 acquires necessary map information 542 from a map database. When the map database is installed in the vehicle 1, the control device 50 acquires necessary map information 542 from the map database. On the other hand, when the map database exists outside the vehicle 1, the control device 50 acquires necessary map information 542 through the communication device 408. The map information 542 is stored in the memory 54, and is read out and used as appropriate.

Further, the control device 50 acquires the driving environment information 400. The driving environment information 400 is stored in the memory 54, and is read out and used as appropriate. Specifically, the driving environment information 400 includes surrounding situation information, vehicle position information, vehicle state information, driving support level information, electronic connection information, and distribution information. The surrounding situation information indicates the surrounding situation of the vehicle 1. The surrounding situation information is information obtained from the detection result by the surrounding situation sensor 402. The control device 50 acquires the surrounding situation information based on the detection result of the surrounding situation sensor 402.

The vehicle position information is information indicating the position and direction of the vehicle. The controller acquires vehicle position information from the vehicle position sensor 404. Further, the control device 50 may perform a well-known self-position estimation process (localization) by using target object information included in the surrounding situation information to improve the accuracy of the vehicle position information.

The vehicle state information is information indicating the state of the vehicle 1. The state of the vehicle 1 includes a speed, acceleration, a steering angle, a yaw rate, and the like of the vehicle 1. Further, the state of the vehicle 1 includes whether or not the driver is on board the vehicle 1, and the driving operation of the driver. The driving operation includes an accelerator operation, a brake operation, and a steering operation of the vehicle 1. The control device 50 acquires vehicle state information from the vehicle state sensor 406.

The driving support level information is information indicating the driving support level of the vehicle 1. The driving support level information is unique information determined by the driving support control device 4 installed on the vehicle 1. Further, the electronic connection information is information indicating a state of electronic connection or disruption with the surrounding vehicle.

The distribution information is information obtained through the communication device 408. The control device 50 acquires the distribution information by communicating with the outside by using the communication device 408. For example, the distribution information includes road traffic information distributed from the infrastructure. The distribution information also includes driving environment information obtained from surrounding vehicles which are electronically connected by vehicle-to-vehicle communication.

The control device 50 generates a travel plan of the vehicle 1 based on the map information 542 and the driving environment information 400. The driving plan includes a target route to a destination and a local target trajectory (a target trajectory in a lane and a target trajectory for lane change). The travel plan includes a vehicle travel plan for following a target trajectory, following a traffic rule, and avoiding an obstacle, and the like. The control device 50 controls the traveling device 60 so that the vehicle 1 executes the driving support control according to the traveling plan.

2-3. Configuration of Platooning Management System

Returning to FIG. 3 again, an example of the configuration of the platooning management system 10 will be described. The platooning management system 10 includes a control device (controller) 12 and an HMI (Human Machine Interface) unit 14. The control device 12 is a microcomputer including a processor 20 and a memory 30. The platooning management system 10 is also referred to as "ECU (Electronic Control Unit)". The processor 20 executes the program stored in the memory 30, thereby executing various processes by the platooning management system 10.

The HMI unit 14 is an interface for providing information to a designator who designates a platoon of platooning travel and for accepting information from the designator. Specifically, the HMI unit 14 includes an input device 16 and an output device 18. Examples of the input device 16 include a touch panel, a switch, and a microphone. Examples of the output device 18 include a display device, a speaker, and the like.

The program stored in the memory 30 of the platooning management system 10 includes a formation process 302 and a platooning process 304. Based on the received vehicle information 308 of each vehicle 1, the formation process 302 determines the suitability of a designated platoon designated by the designator to the platooning, and outputs the determination result (i.e. suitability result). The set designated platoon is stored in the memory 30 as the vehicle group information 310, and is read out and used as appropriate. The set vehicle group information 310 is also transmitted to each vehicle 1 constituting the vehicle group 2. The platooning process 304 controls the operation of the platooning travel of the vehicle group 2 based on the vehicle group information 310. Hereinafter, the configuration of the formation process 302, which is a feature of the platooning system 100 according to the first embodiment, and the specific processing thereof will be described in detail.

3. Formation Process 3-1. Configuration of Formation Process

Figure 5:
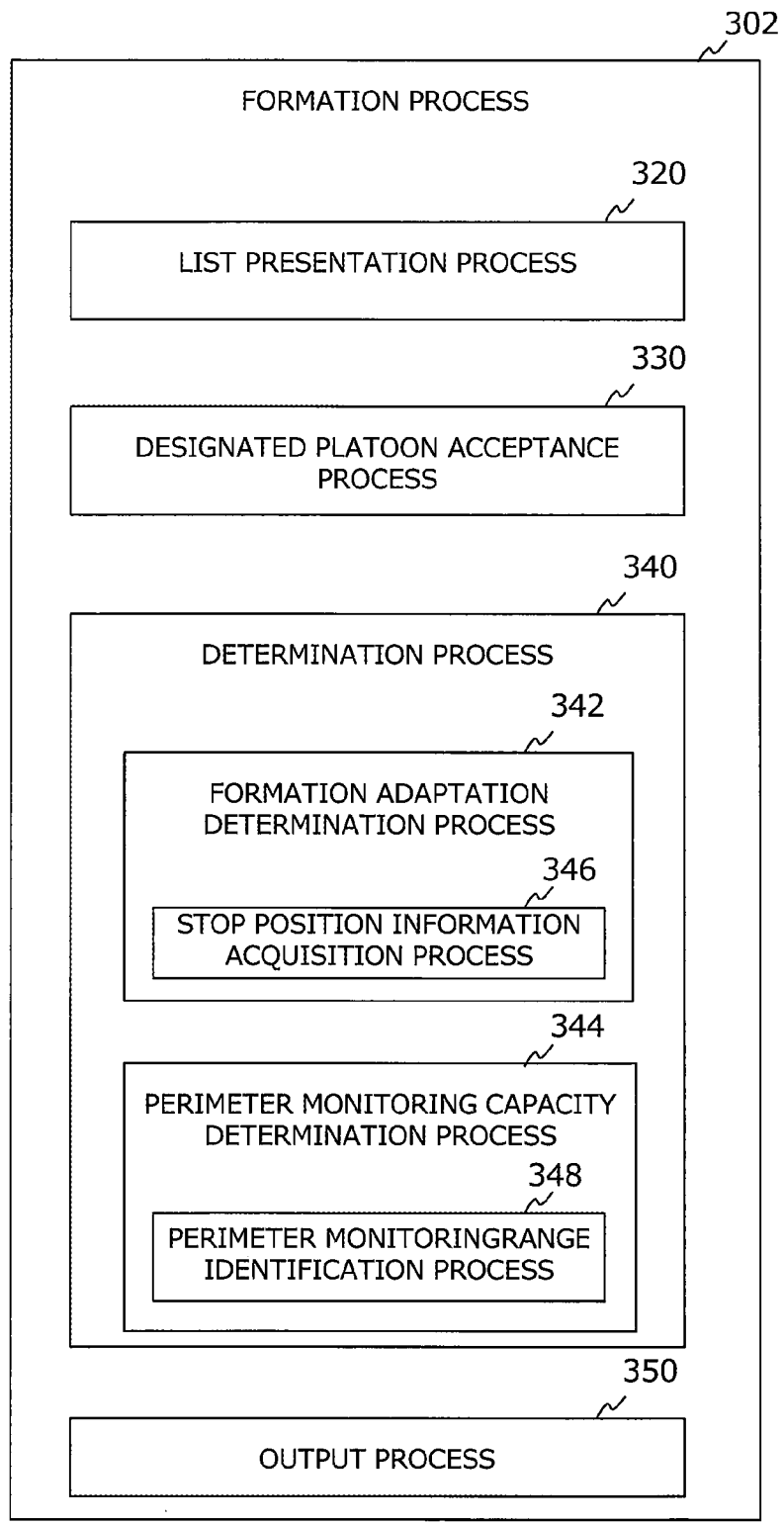
FIG. 5 is a block diagram showing an example of a configuration of various processes included in a formation process.

FIG. 5 is a block diagram showing an example of the configuration of various processes included in the formation process. As shown in this drawing, the formation process 302 includes a list presentation process 320, a designated platoon acceptance process 330, a determination process 340, and an output process 350. The determination process 340 includes a formation adaptation determination process 342 and a stop position information acquisition process 346 as internal processing thereof, and a perimeter monitoring capacity determination process 344 and a perimeter monitoring range identification process 348 as internal processing thereof. The formation process 302 determines whether the designated platoon designated from among the target vehicles stopped in the target area corresponding to a departure point is suitable for platooning travel, and outputs the result.

Figure 6:
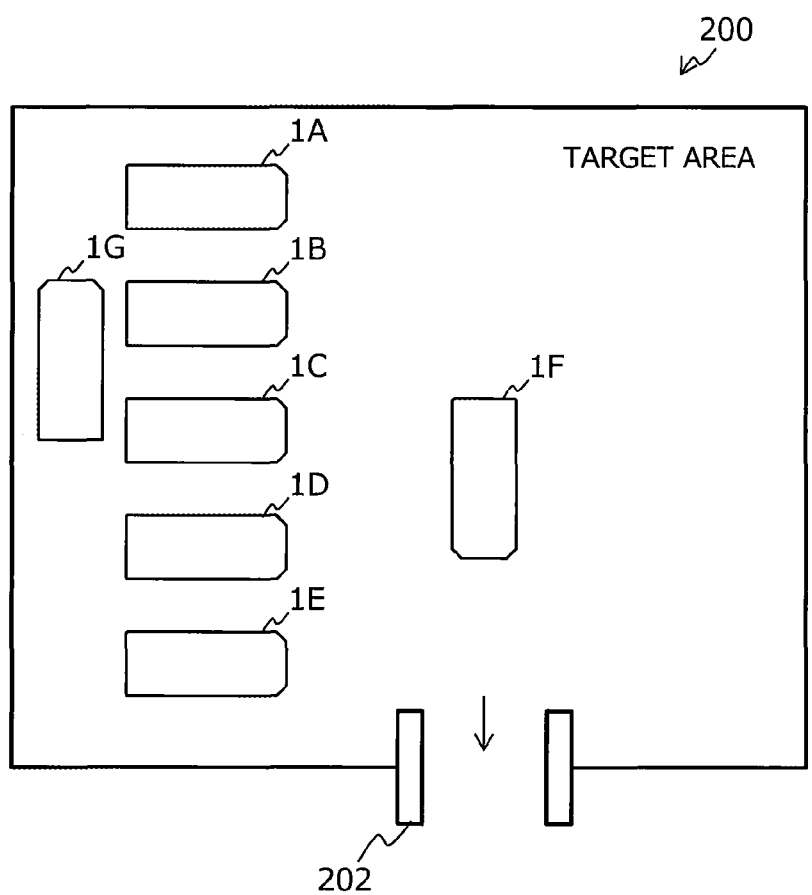
FIG. 6 is a diagram showing an example of stop positions of target vehicles stopped in a target area.

FIG. 6 is a diagram showing an example of stop positions of the target vehicles stopped in the target area. In the example shown in this drawing, the target area 200 is a rectangular site, and one vehicle entrance/exit 202 is provided. In the target area 200, it is assumed that the seven target vehicles 1A to 1G that can be the target of the platooning travel is stopped at the position shown in FIG. 6. In the flowcharts shown below, a formation process for organizing platoon for platooning travel from these target vehicles 1A to 1G will be described.

3-2. Specific Processing of Formation Process

Figure 7:
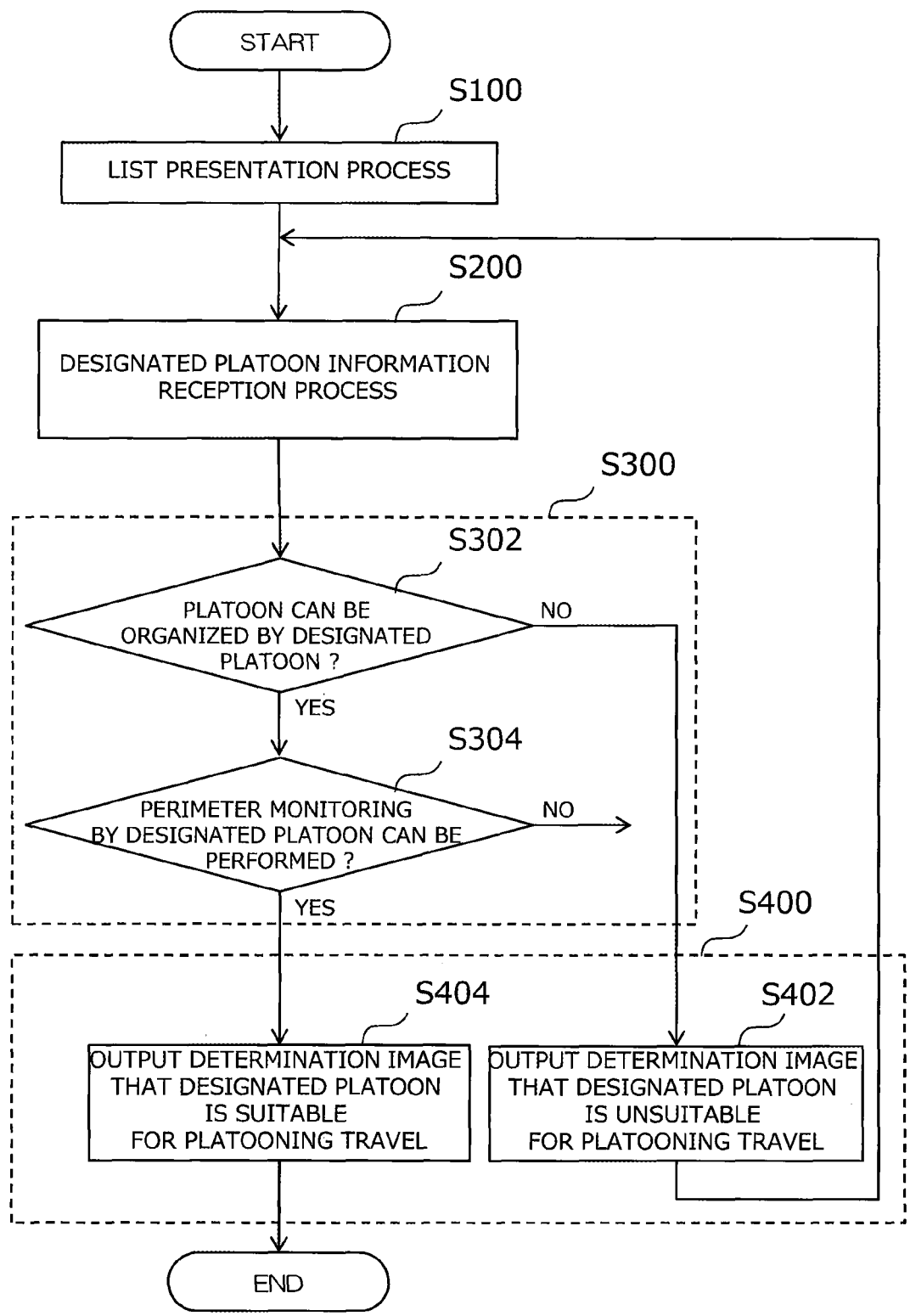
FIG. 7 is a flowchart showing a routine of the formation process executed in the platooning system according to the first embodiment.

FIG. 7 is a flowchart showing a routine of a formation process executed in the platooning system according to the first embodiment. The routine shown in FIG. 7 is roughly divided into a list presentation process S100, a designated platoon information acceptance process S200, a determination process S300, and an output process S400. The routine shown in FIG. 7 is executed by the processor 20 of the control device 12 executing the program of the formation process 302 stored in the memory 30. Specifically, in the routine shown in FIG. 7, the list presentation process of step S100 is executed by executing the list presentation process 320 among the programs of the formation process 302, the designated platoon information acceptance process of step S200 is executed by executing the designated platoon acceptance process 330, the determination process of step S300 is executed by executing the determination process 340, and the output process of the step S400 is executed by executing the output process 350.

Step S100: List Presentation Process

In step S100, the control device 12 generates a list 182 of the target vehicles 1A to 1G parked in the target area 200, and presents the list 182 to the designator who designates the organization of the platoon for performing the platooning travel. Here, the list 182 is a list that provides information that can be used as an indicator when a designator designates a platoon candidate vehicle and a platoon order for platooning travel. The list 182 includes active vehicle information indicating whether or not the respective target vehicles 1A to 1G are active vehicle corresponding to the platooning travel by electronic connection. The active vehicle information is particularly useful information because it is a prerequisite for carrying out the platooning travel. For example, the list 182 is an image, and the image is output from the output device 18 as a display device.

The form of the list 182 is not limited. In addition to the active vehicle information, the list 182 may include other information that may be an indicator for designating the platoon candidate vehicles and the platoon order. Specific examples of the list 182 and the presentation process thereof presented in the step S100 will be described below.

3-3-1. Stop Position Information List

Figure 8:
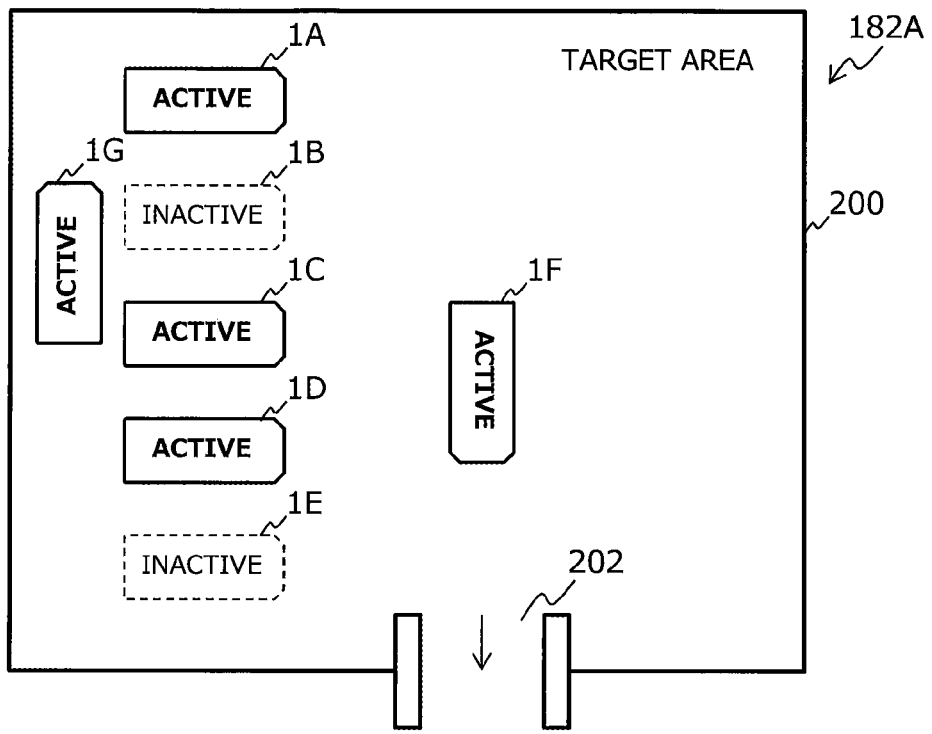
FIG. 8 is a diagram showing an example of a stop position information list.

The list 182 may be configured as a stop position information list 182A. Here, the stop position information list 182A is a list including stop position image of the target vehicles 1A to 1G in the target area 200. FIG. 8 is a diagram showing an example of a stop position information list. The stop position information list 182A shown in FIG. 8 includes an image indicating the stop positions of the target vehicles 1A to 1G in the target area 200, as well as information indicating whether or not each target vehicle 1A to 1G is an active vehicle. In the example shown in FIG. 8, the active vehicles and inactive vehicles are visually distinguished from each other by the letters attached to the target vehicles 1A to 1G and the line type of the stop position.

When organizing the platoon of the platooning travel, it is preferable to organize the platoon by moving in the order of the platoon. In the example shown in FIG. 8, since the target vehicle 1G cannot move to the vehicle entrance/exit 202 until after the target vehicle 1A has moved, it is inappropriate to designate the platoon order of the target vehicle 1G prior to the target vehicle 1A. Thus, the stop position information list 182A is a list useful in the meaning that it is possible to determine a suitable platoon candidate vehicle and platoon order from the standpoint of the stop position. The display form of the stop position information list 182A is not limited to the example shown in FIG. 8. For example, the stop position information list 182A is not limited to expression methods such as characters, images, line types, colors, display effects, and the like, as long as the list includes the active vehicle information and the stop position information of the target vehicles.

Figure 9:
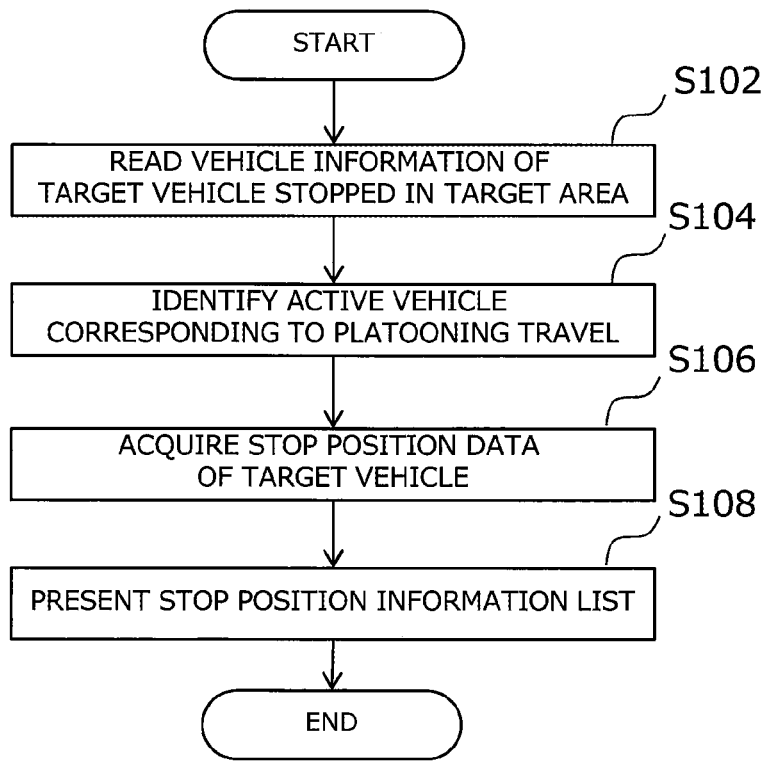
FIG. 9 is a flowchart showing a routine of a list presentation process of the stop position information list.

FIG. 9 is a flowchart showing a routine of a list presentation process of the stop position information list. The routine shown in FIG. 9 is an exemplary subroutine executed in step S100. In the routine shown in FIG. 9, first, the control device 12 reads the vehicle information of the target vehicles stopped in the target area 200 from the vehicle information 308 stored in the memory 30 in step S102. Here, the vehicle information includes information useful for determining whether or not each target vehicle is an active vehicle corresponding to the platooning travel, such as driving support level information, destination information, driver boarding information, vehicle classification information, and the like of each target vehicle 1A to 1G.

In step S104, the control device 12 identifies an active vehicle from the target vehicles 1A to 1G. Here, the control device 12 specifies, for example, a target vehicle in which the driving support level is equal to or higher than the LV-3, or a target vehicle in which the driving support level is LV-2 and the driver is on board, as an active vehicle. The method of specifying the active vehicle is not limited. For example, in the case where a destination or a travel route is determined for each target vehicle, whether these conditions are common or not may be further added to the condition for determining an active vehicle.

In step S106, the control device 12 acquires the stop position data of the target vehicles stopped in the target area 200. Here, the control device 12 reads the vehicle position information of the target vehicles 1A to 1G stopped in the target area 200 from the vehicle information 308 stored in the memory 30. In the following step S108, the control device 12 presents the stop position information list 182A. Here, the control device 12 generates the stop position information list 182A in which the information of the active vehicle is added to the image indicating the stop position in the target area 200 of the target vehicles 1A to 1G based on the specified information on the active vehicle and the vehicle position information. Then, the control device 12 displays the generated stop position information list 182A on the output device 18 as a display device.

3-3-2. Vehicle Specification Information List

Figures 10, 11:
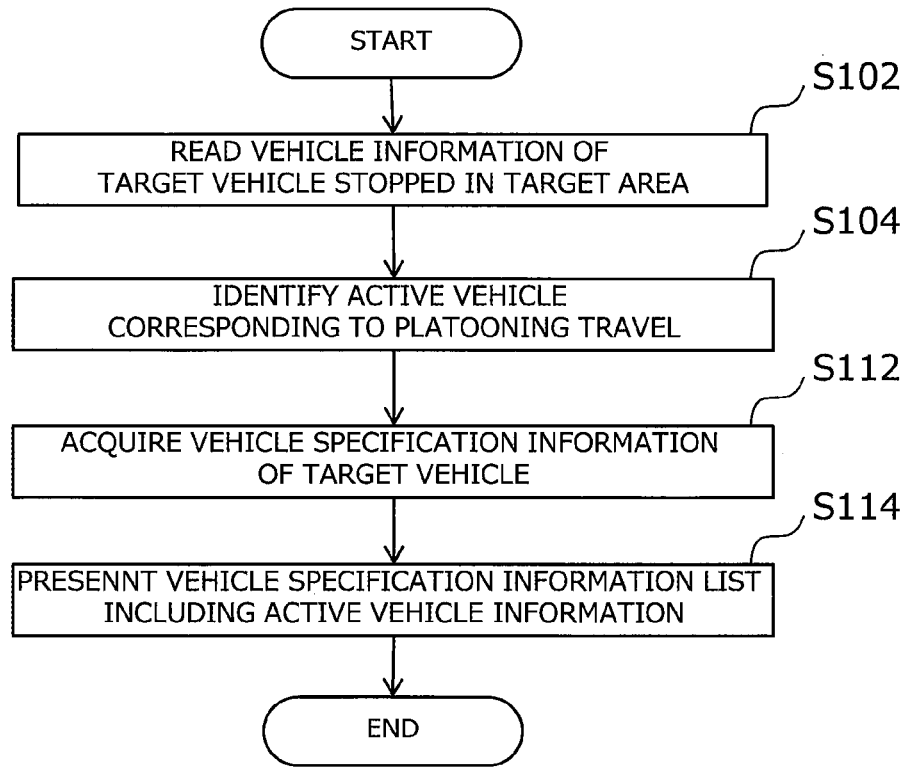
FIG. 10 is a diagram showing an example of a vehicle specification information list.
FIG. 11 is a flowchart showing a routine of a list presentation process of the vehicle specification information list.

The list 182 may be configured as a vehicle specification information list 182B. Here, the vehicle specification information list 182B is a list including various specifications of the target vehicles 1A to 1G in the target area 200. FIG. 10 is a diagram showing an example of the vehicle specification information list. In the vehicle specification information list 182B shown in FIG. 10, information such as the driving support levels, the driver boarding status, vehicle classification, and the like are added in a tabular form in addition to whether or not the target vehicles 1A to 1G are active. In the examples shown in FIG. 10, the active vehicle and the inactive vehicle are visually distinguished from each other by letters and ornamentals attached to the target vehicles 1A to 1G.

When organizing the platoon for the platooning travel, it is preferable to disperse and organize vehicles with high grade support level or vehicles on which driver is on board in preparation for division of the platoon due to line cutting of surrounding vehicles or the like. In addition, the vehicle classification of the target vehicles may be an index for judging the loading efficiency. In addition, depending on the destination, a vehicle having a large vehicle size may be unsuitable. As described above, the vehicle specification information list 182B is a list useful in the meaning that it is possible to determine a suitable platoon candidate vehicle and a platoon order from the viewpoint of smooth platooning travel. The display form of the vehicle specification information list 182B is not limited to the example shown in FIG. 10. For example, if the vehicle specification information list 182B includes active vehicle information and vehicle specification information, the method of expressing characters, images, line types, colors, display effects, and the like is not limited.

FIG. 11 is a flowchart showing a routine of a list presentation process of the vehicle specification information list. The routine shown in FIG. 11 is an exemplary subroutine executed in step S100. In steps S102 and S104 of the routine shown in FIG. 11, the same processes as the steps S102 and S104 of the routine shown in FIG. 9 are executed.

When the process of step S104 is completed, the control device 12 acquires the vehicle specification information of the target vehicles stopped in the target area 200 in step S112. In this case, the control device 12 reads, from the vehicle information 308 stored in the memory 30, the information relating to the specifications of the target vehicles 1A to 1G stopped in the target area 200. In the following step S114, the control device 12 presents the vehicle specification information list 182B. Here, the control device 12 generates the vehicle specification information list 182B in which information of the active vehicle is added to the specification information of the target vehicles 1A to 1G and is summarized in a diagram, based on the specified information on the active vehicle and the vehicle specification information. Then, the control device 12 displays the generated vehicle specification information list 182B on the output device 18 as a display device.

3-3-3. Perimeter Monitoring Range Information List

The list 182 may be configured as a perimeter monitoring range information list 182C. Here, the perimeter monitoring range information list 182C is a list including peripheral monitoring information of the respective target vehicles 1A to 1G. Here, the peripheral monitoring information indicates information on a range that can be monitored by a sensor group composed of the surrounding situation sensors 402 mounted on the target vehicle. The peripheral monitoring information is not limited to information indicating a two-dimensional range, and may be configured as information indicating a three-dimensional range including an observable range in the height direction of the vehicle.

Figure 12:
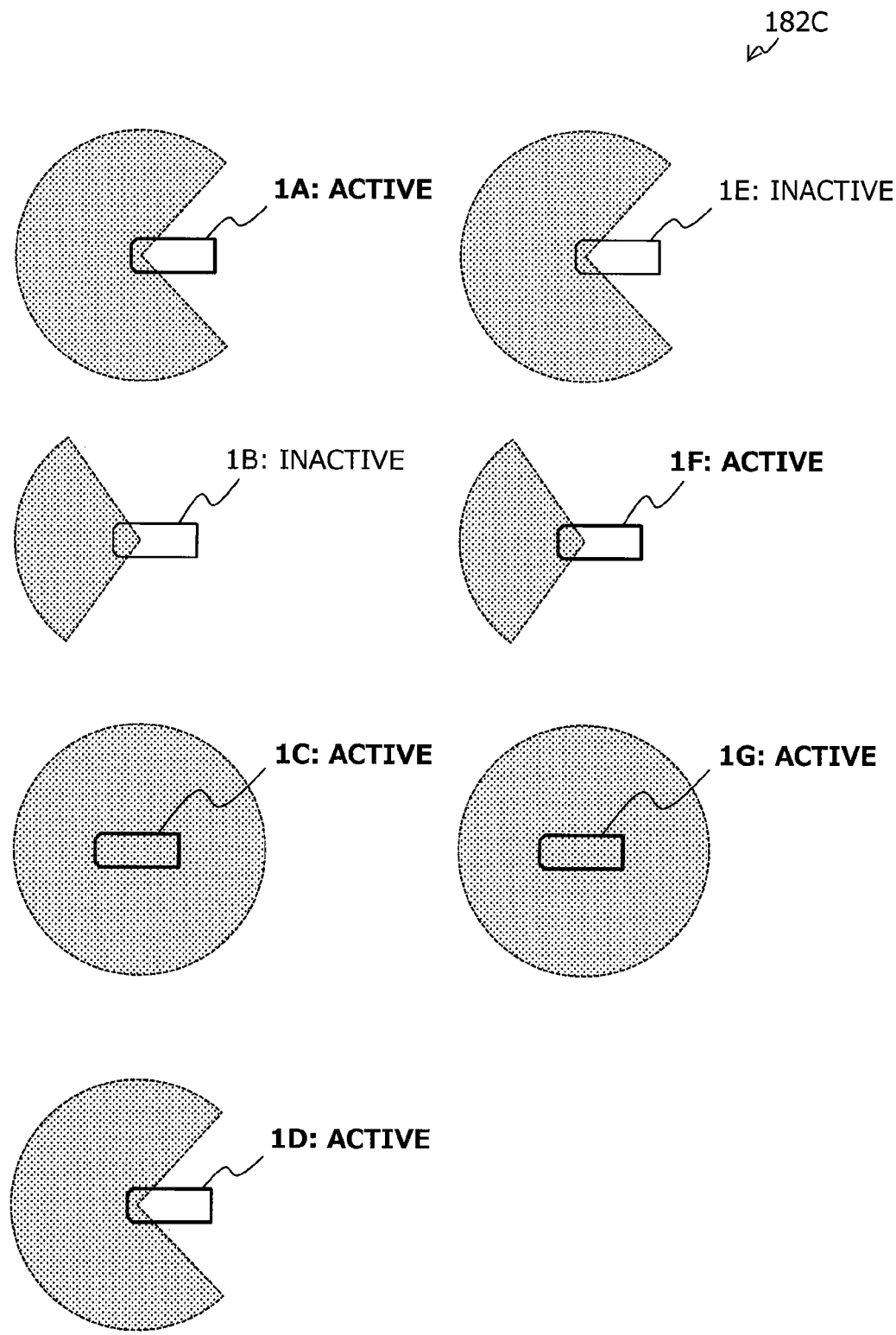
FIG. 12 is a diagram showing an example of a perimeter monitoring range information list.

FIG. 12 is a diagram showing an example of the perimeter monitoring range information list. The perimeter monitoring range information list 182C shown in FIG. 12 includes images indicating the surrounding monitoring range of each of the target vehicles 1A to 1G, as well as information indicating whether each of the target vehicles 1A to 1G is an active vehicle. In the examples shown in FIG. 12, the active vehicle and the inactive vehicle are visually distinguished from each other by letters and line types attached to the target vehicles 1A to 1G.

When organizing the platoon for platooning travel, it is preferable to organize the platoon capable of monitoring the periphery of the platoon. In particular, in driving at an advanced driving support level in which the driving support level is equal to or higher than the LV-4, it is essential to monitor the surrounding area of the platoon without omission. In the example shown in FIG. 12, for example, since the target vehicle 1F cannot be monitored rearward, the last vehicle of a platoon is not suitable. In addition, for example, if a vehicle having a wide front monitoring range is organized as a leading vehicle of a platoon, it is possible to increase the vehicle speed of the platoon. As described above, the perimeter monitoring range information list 182C is a list useful in the meaning that it is possible to determine suitable platoon candidate vehicles and platoon order from the viewpoint of driving support control. The display form of the perimeter monitoring range information list 182C is not limited to the example shown in FIG. 12. For example, the perimeter monitoring range information list 182C is not limited to a method of expressing characters, images, line types, colors, display effects, and the like as long as the list 182C includes active vehicle information and peripheral monitoring information of the target vehicles.

Figure 13:
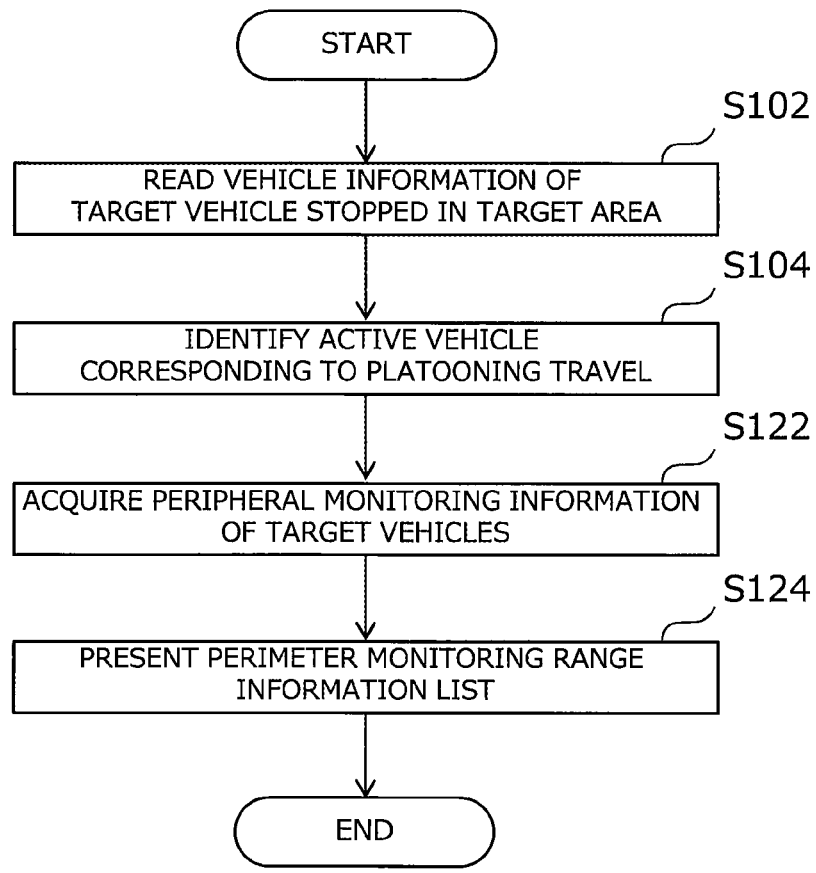
FIG. 13 is a flowchart showing a routine of a list presentation process of the perimeter monitoring range information list.

FIG. 13 is a flowchart showing a routine of a list presentation process of the perimeter monitoring range information list. The routine shown in FIG. 13 is an exemplary subroutine executed in step S100. In steps S102 and S104 of the routine shown in FIG. 13, the same processes as in steps S102 and S104 of the routine shown in FIG. 9 are executed.

When the process of step S104 is completed, in step S122, the control device 12 acquires the peripheral monitoring information of the target vehicles 1A to 1G. Here, the control device 12 reads the sensor mounting information of the target vehicles 1A to 1G from the vehicle information 308 stored in the memory 30. Then, the control device 12 specifies the perimeter monitoring range of the target vehicles based on the read sensor mounting information. In the following step S124, the control device 12 presents the perimeter monitoring range information list 182C. Here, the control device 12 generates the perimeter monitoring range information list 182C in which the information of the active vehicle is added to the image indicating the perimeter monitoring range of the target vehicles 1A to 1G based on the specified information on the active vehicle and the perimeter monitoring range information. Then, the control device 12 displays the generated perimeter monitoring range information list 182C on the output device 18 as a display device.

3-4. Step S200: Designated Platoon Information Acceptance Process

In step S200, the control device 12 accepts, from the input device 16, the platoon candidate vehicles for platooning travel and the designated platoon designated by the platoon order, while presenting the lists to the output device 18. The output device 18 displays an image containing the information of the designated platoon received from the input device 16. This image is referred to as "designation acceptance image 184".

3-4-1. Designated Platoon Information Reception Process Using a Stop Position Information List For example, when the list presented on the output device 18 is the stop position information list 182A, the control device 12 accepts from the input device 16 the designation of the platoon candidate vehicle and the platoon order for platooning travel from the designator in a state in which the stop position information list 182A shown in FIG. 8 is presented.

Figures 14, 15:
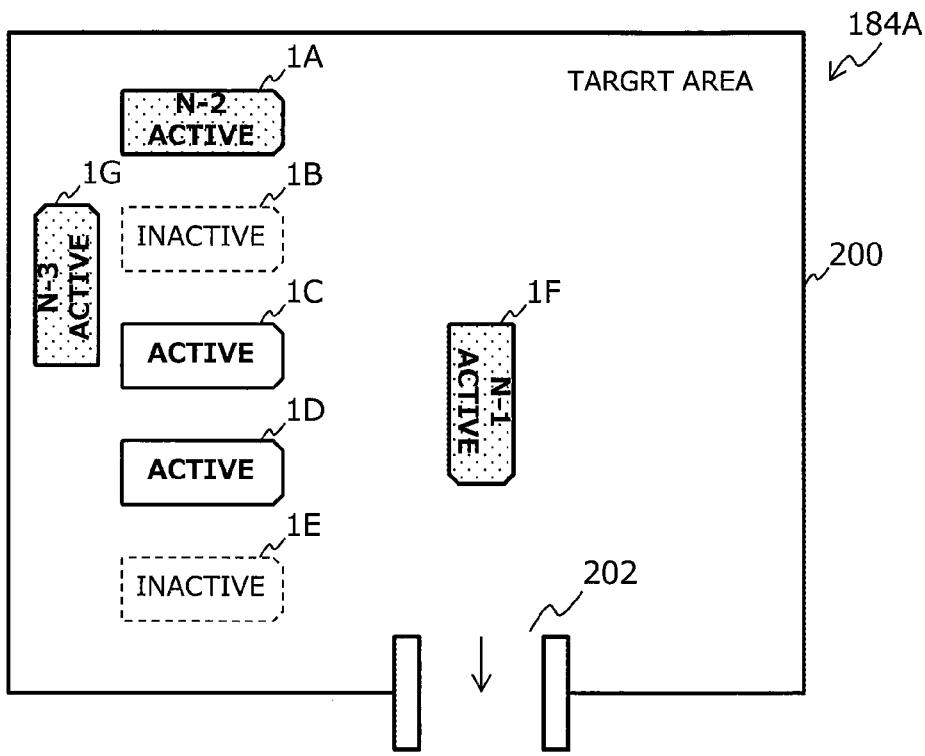
FIG. 14 is a diagram showing an example of a display image in a case where designation of a platoon candidate vehicle and a platoon order for platooning travel is accepted from a stop position information list.
FIG. 15 is a diagram showing an example of a display image in a case where designation of the platoon candidate vehicle and a platoon order for platooning travel is accepted from a vehicle specification information list.

The designator designates the platoon candidate vehicle and the platoon order while referring to the displayed stop position information list 182A. FIG. 14 is a diagram showing an example of a display image in a case where designation of a platoon candidate vehicle and a platoon order for platooning travel is accepted from a stop position information list. This image is referred to as "designated acceptance image with stop position image 184A". For example, in the case where the output device 18 is a touch panel integrated with the input device 16, the control device 12 accepts the target vehicles and the order touched on the screen by the designator as the platoon candidate vehicle and the platoon order. In the example shown in FIG. 14, for example, the designator touches the target vehicles 1F, 1A and 1G of the stop position information list 182A in order. In response to the designation of the platoon candidate vehicles and the platoon order from the designator, the control device 12 outputs the designated acceptance image 184A with stop position image in which the display of the platoon candidate vehicles and the platoon order is added to the stop position information list 182A. In the examples shown in FIG. 14, the description of the platoon order N-1, N-2, N-3 is added to the platoon candidate vehicles 1F, 1A and 1G respectively, and textures are added to the platoon candidate vehicles. According to such acceptance process, the designator can designate the platoon candidate vehicle and the platoon order while checking the stop position of each target vehicle displayed in the stop position information list 182A. The method by which the control device 12 accepts the designation of the platoon candidate vehicle and the platoon order from the stop position information list 182A is not limited to the above. For example, in the case where a keyboard, a mouse, or the like is used as the input device 16, the designation of the platoon candidate vehicles and the platoon order may be accepted from these input devices.

3-4-2. Designated Platoon Information Reception Process Using Vehicle Specification List Further, for example, in the case where the list presented to the output device 18 is the vehicle specification information list 182B, the control device 12 accepts from the input device 16 designation of the platoon candidate vehicle and the platoon order for platooning travel from the designator in the state where the vehicle specification information list 182B shown in FIG. 10 is presented.

The designator designates the platoon candidate vehicle and the platoon order while referring to the displayed vehicle specification information list 182B. FIG. 15 is a diagram showing an example of a display image in a case where designation of the platoon candidate vehicle and the platoon order for platooning travel is accepted from the vehicle specification information list. This image is referred to as "designated acceptance image 184B with vehicle specification information". For example, in the case where the output device 18 is a touch panel integrated with the input device 16, the control device 12 accepts the target vehicles and the order touched on the screen by the designator as the platoon candidate vehicle and the platoon order. In the example shown in FIG. 15, for example, the designator touches the target vehicles 1F, 1A and 1G of the vehicle specification information list 182B in order. The control device 12 receives the designation of the platoon candidate vehicles and the platoon order from the designator, and outputs the designated acceptance image 184B with vehicle specification information in which the display of the platoon order is added to the column of the platoon designations of the vehicle specification information list 182B. In the examples shown in FIG. 15, descriptions of the platoon order N-1, N-2, and N-3 are added to the column of the platoon designations of the platoon candidate vehicles 1F, 1A and 1G respectively, and textures are added to the column of the corresponding platoon candidate vehicles. According to such acceptance process, the designator can designate the platoon candidate vehicles and the platoon order while checking the vehicle specification of each target vehicle displayed in the vehicle specification information list 182B. It should be noted that the method by which the control device 12 accepts the designation of the platoon candidate vehicle and the platoon order from the vehicle specification information list 182B is not limited to the above. For example, in the case where a keyboard, a mouse, or the like is used as the input device 16, the designation of the platoon candidate vehicles and the platoon order may be accepted from these input devices.

3-4-3. Designated Platoon Information Reception Process Using Perimeter Monitoring Range Information List Further, for example, in the case where the list presented to the output device 18 is the perimeter monitoring range information list 182C, the control device 12 accepts designation of the platoon candidate vehicles and the platoon order for platooning travel from the designator from the input device 16 in the state where the perimeter monitoring range information list 182C shown in FIG. 12 is presented.

Figure 16:
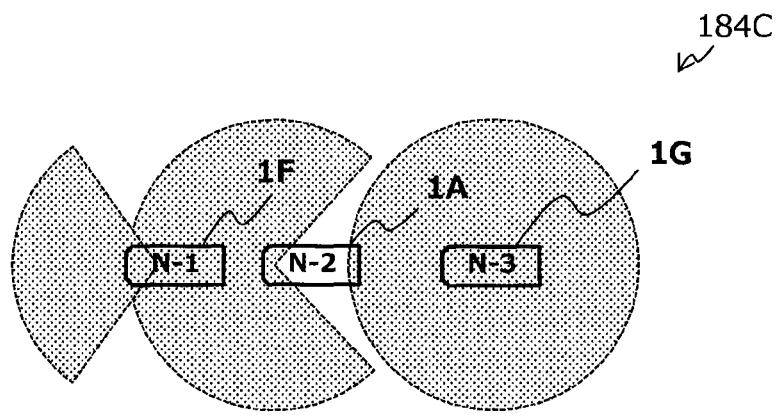
FIG. 16 is a diagram showing an example of a display image in the case where designation of the platoon candidate vehicles and their platoon order for platooning travel is accepted from a perimeter monitoring range information list.

The designator designates the platoon candidate vehicles and the platoon order while referring to the displayed perimeter monitoring range information list 182C. FIG. 16 is a diagram showing an example of a display image in a case where designation of a platoon candidate vehicles and their platoon order for platooning travel is accepted from the perimeter monitoring range information list. This image is referred to as "designated reception image 184C with perimeter monitoring range information". For example, in the case where the output device 18 is a touch panel integrated with the input device 16, the control device 12 accepts the target vehicles and the platoon order thereof as the platoon candidate vehicles and their platoon order in the case where the designator arranges the target vehicles in the order of the vehicles by touching and dragging on the screen. In the example shown in FIG. 16, for example, the designator touches and drags the target vehicles 1F, 1A and 1G of the perimeter monitoring range information list 182C on the screen to arrange them in the platoon order of the vehicles. The control device 12 receives the designation of the platoon candidate vehicles and the platoon order from the designator, and outputs the designated reception image 184C with perimeter monitoring range information in which the display of the platoon order is added to the platoon order arranged by the designator. In the examples shown in FIG. 16, descriptions of the platoon order N-1, N-2, and N-3 are added to the column of the platoon designations of the platoon candidate vehicles 1F, 1A and 1G respectively. According to such acceptance process, the designator can designate the platoon candidate vehicles and the platoon order while checking the perimeter monitoring range of each target vehicle displayed in the perimeter monitoring range information list 182C. It should be noted that the method by which the control device 12 receives the designation of the platoon candidate vehicles and the platoon order from the perimeter monitoring range information list 182C is not limited to the above. For example, in the case where a keyboard, a mouse, or the like is used as the input device 16, the designation of the platoon candidate vehicles and the platoon order may be accepted from these input devices.

Step S300: Determination Process

In step S300, the control device 12 determines whether or not the designated platoon accepted in step S200 is suitable for platooning travel. In this step, the control device 12 first determines whether or not the platoon can be organized by the designated platoon (step S302). The determination process of this step S302 is referred to as "formation adaptation determination process". Here, the control device 12 performs a process of acquiring the stop position information of the target vehicles stopped in the target area 200. This processing is referred to as "stop position information acquisition process". Specifically, the control device 12 reads the vehicle position information of the target vehicles 1A to 1G stopped in the target area 200 from the vehicle information 308 stored in the memory 30. Next, based on the vehicle position information, the control device 12 determines whether or not the designated platoon candidate vehicles can move in the designated platoon order to go to the vehicle entrance/exit 202 of the target area 200. As a result, when the establishment of the determination is recognized, the process proceeds to the process of the subsequent step S304, and when the establishment of the determination is not recognized, the process proceeds to the process of the later-described step S402.

In the step S304, the control device 12 determines whether or not the perimeter monitoring by the designated platoon can be performed. The determination process of this step S304 is referred to as "perimeter monitoring capacity determination process". Here, the control device 12 reads the sensor mounting information of the target vehicles 1A to 1G from the vehicle information 308 stored in the memory 30. Then, the control device 12 specifies the perimeter monitoring range of the designated platoon based on the read sensor mounting information. This processing is referred to as "perimeter monitoring range identification process". The perimeter monitoring range may be specified as a two-dimensional area or may be specified as a three-dimensional spatial volume. Next, the control device 12 determines whether or not the perimeter monitoring range includes 360 degrees around the designated platoon without omission. Here, the determination can be performed, for example, by calculating an evaluation value indicating to what extent the perimeter monitoring range of the specified designated platoon covers the ideal perimeter monitoring range, and comparing the evaluation value with a threshold value. As a result, when the establishment of the determination is recognized, the process proceeds to the process of step S404 described later, and when the establishment of the determination is not recognized, the process proceeds to the process of step S402 described later.

In the determination process of step S300, in addition to the determination of step S302 and step S304 described above, the determination of other elements may be further added. For example, the control device 12 may determine whether or not vehicles having a high driving support level or vehicles on which drivers ride are distributed and organized in a designated platoon in preparation for the case where the platoon is divided by interruption of peripheral vehicles or the like. Also, depending on the destination, there may be cases where a vehicle with a large vehicle classification is not suitable, so the control device 12 may determine whether the platoon candidate vehicle is a vehicle classification corresponding to the destination. Further, a vehicle having a wide front perimeter monitoring range is suitable for a leading vehicle, and a vehicle having a wide rearward perimeter monitoring range is suitable for a trailing end vehicle. For this reason, the control device 12 may determine whether or not a vehicle in such a perimeter monitoring range is designated as a leading vehicle or a trailing end vehicle. Further, an evaluation function reflecting the above-mentioned various determinations may be defined, and the suitability of the designated platoon to the platooning may be determined based on the evaluation value of the evaluation function.

In the routine shown in FIG. 7, in the program of the formation process 302, the formation adaptation determination process 342 and the stop position information acquisition process 346 as the internal process thereof are executed, whereby the determination process of the step S302 is executed, and the perimeter monitoring capacity determination process 344 and the perimeter monitoring range identification process 348 as the internal process thereof are executed, whereby the determination process of the step S304 is executed.

3-6. Step S400: Output Process

In step S400, the control device 12 outputs the determination result (i.e. suitability result) processed in step S300. The judgment result includes the suitability information indicating whether or not the designated platoon is suitable for platooning travel. The determination result is, for example, an image in which the suitability information is associated with the designation acceptance image 184, and is output from the output device 18 as a display device. The image of the determination result is referred to as a "determination result image 186". Note that the display content of the determination result image 186 is not limited as long as the determination result image 186 includes the suitability information. Further, the control device 12 may present an example of a recommended platoon together with the output of the determination result.

In step S402, the control device 12 outputs the determination result image 186 that the designated platoon is unsuitable for platooning travel. When the process of step S402 is completed, the routine returns to the process of step S200. On the other hand, in the step S404, the control device 12 outputs the determination result image 186 that the designated platoon is suitable for platooning travel. When the process of step S404 is completed, the present routine is terminated. Specific examples of the determination result outputted in step S400 will be described below.

3-6-1. Determination Result with Stop Position Image

Figure 17:
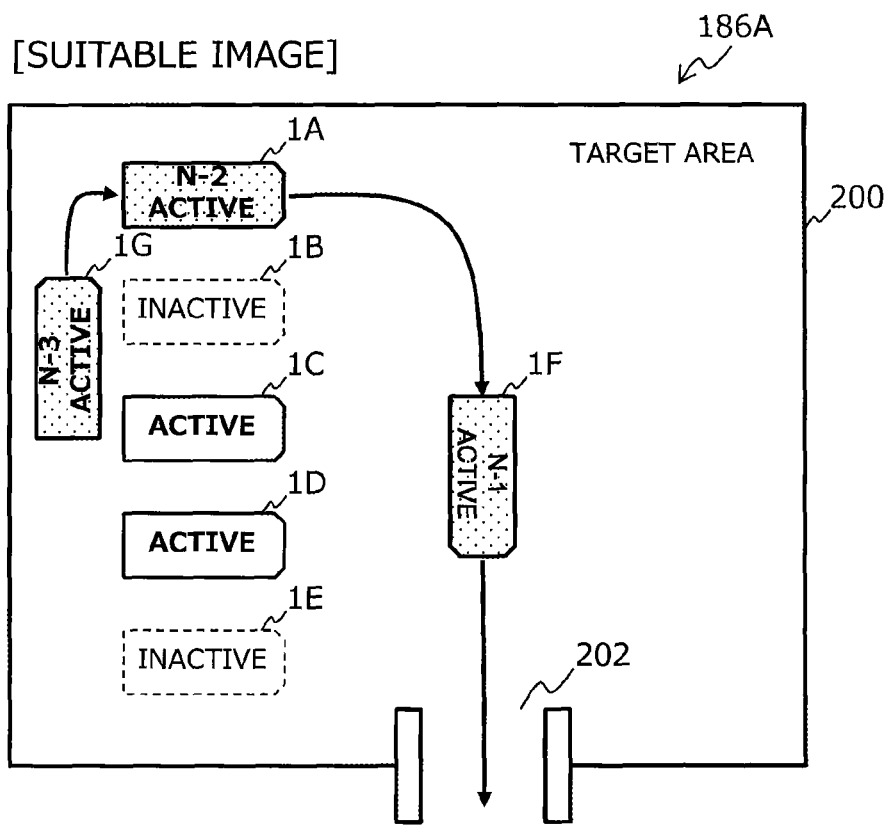
FIG. 17 is a diagram showing an example of a determination result image with stop position information indicating that the determination result is suitable.
Figures 18, 19:
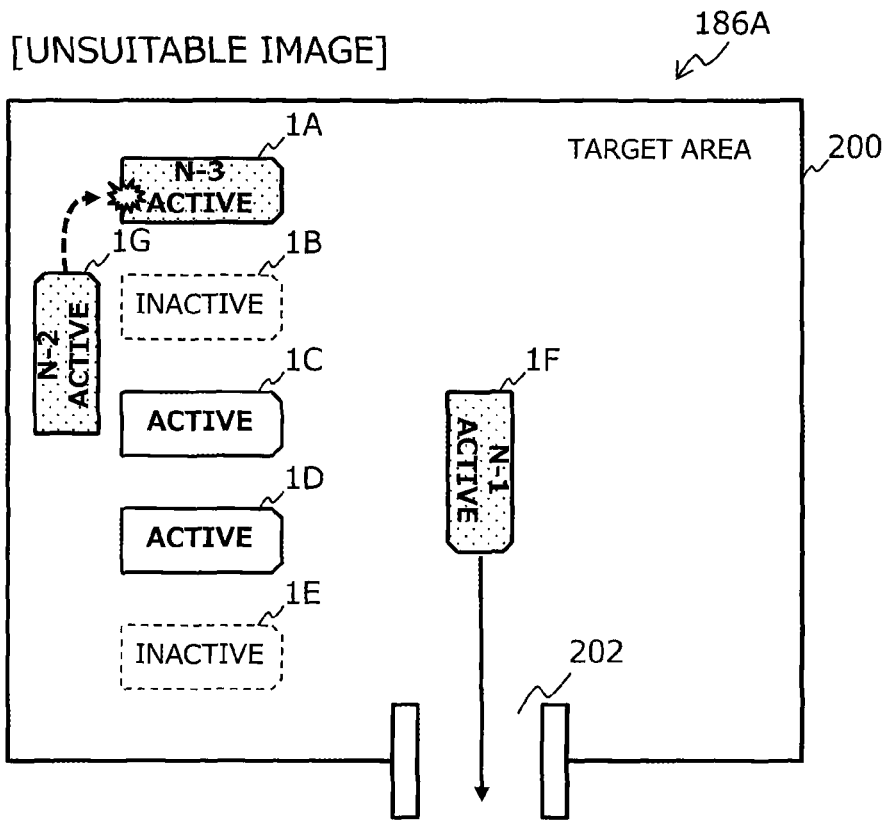
FIG. 18 is a diagram showing an example of a determination result image with stop position information indicating that the determination result is unsuitable.
FIG. 19 is a diagram showing an example of a determination result image with vehicle specification information indicating that the determination result is suitable.

For example, when the image used in the designated platoon information reception process is the designated acceptance image 184A with stop position image, the control device 12 may output the determination result image 186 in which the designated acceptance image 184A with stop position image is associated with the suitability information, from the output device. This determination result image 186 is referred to as "determination result image 186A with stop position information". FIG. 17 is a diagram showing an example of a determination result image with stop position information indicating that the determination result is suitable. The determination result image 186A with stop position information shown in FIG. 17 is a display image outputted in the process of the above-mentioned step S404. In the example shown in FIG. 17, it is visually shown that the designated platoon can be moved in order from the target area 200 and is suitable for platooning travel. On the other hand, FIG. 18 is a diagram showing an example of a determination result image with stop position information indicating that the determination result is unsuitable. The determination result image 186A with stop position information shown in FIG. 18 is a display image outputted in the process of the above-mentioned step S402. In the example shown in FIG. 18, the platoon candidate vehicle which is not suitable for platooning travel and the reason thereof are visually shown.

The display form of the determination result image 186A with stop position information is not limited to the example shown in FIG. 17 or FIG. 18. For example, the determination result image 186A with stop position information is not limited to the expression method of characters, images, line types, colors, display effects, and the like as long as the determination result information and stop position information are included in the image.

3-6-2. Determination Result with Vehicle Specification Information

Figures 20, 21:
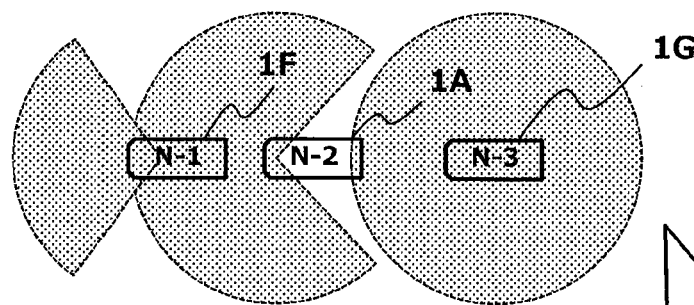
FIG. 20 is a diagram showing an example of a determination result image with vehicle specification information indicating that the determination result is unsuitable.
FIG. 21 is a diagram showing an example of a determination result image with perimeter monitoring range information indicating that the determination result is suitable.

For example, when the image used in the designated platoon information acceptance process is the designated acceptance image 184B with vehicle specification information, the control device 12 may output the determination result image 186 in which the suitability information is associated with the designated acceptance image 1848 with vehicle specification information, from the output device. This determination result image 186 is referred to as "determination result image 186B with vehicle specification information". FIG. 19 is a diagram showing an example of a determination result image with vehicle specification information indicating that the determination result is suitable. The determination result image 186B with vehicle specification information shown in FIG. 19 is an image outputted in the process of the above-described step S404. In the example shown in FIG. 19, it is visually indicated that the designated platoon is suitable for platooning travel. On the other hand, FIG. 20 is a diagram showing an example of a determination result image with vehicle specification information indicating that the determination result is unsuitable. The determination result image 186B with vehicle specification information shown in FIG. 20 is an image outputted in the process of the above-described step S402. In the example shown in FIG. 20, the platoon candidate vehicle which is not suitable for platooning travel and the reason thereof are visually shown.

The display form of the determination result image 186B with vehicle specification information is not limited to the example shown in FIG. 19 or FIG. 20. For example, the determination result image 186B with vehicle specification information is not limited to the expression method of characters, images, line types, colors, display effects, and the like as long as it is an image including the determination result information and the vehicle specification information.

3-6-3. Determination Result with Perimeter Monitoring Range Information

Figure 22:
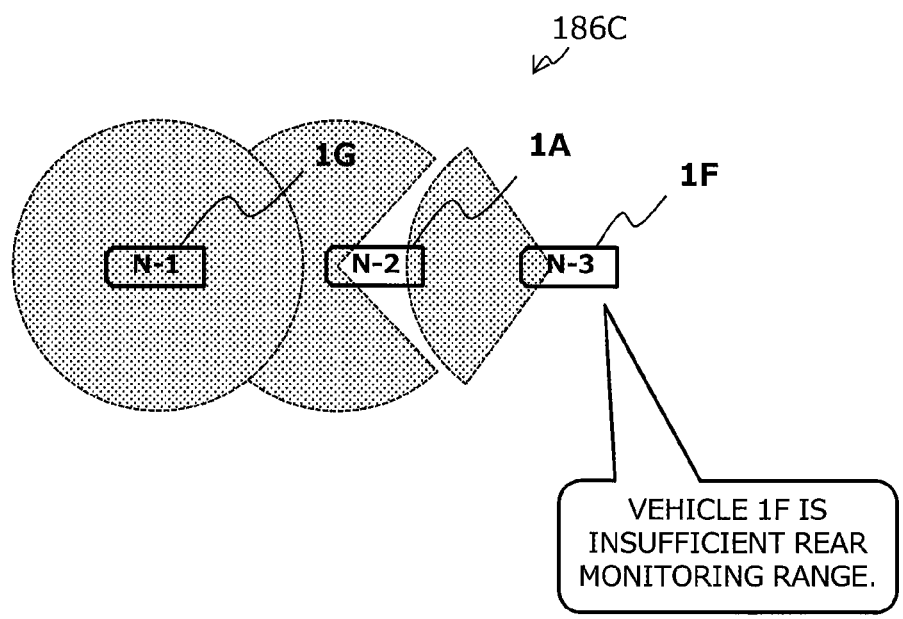
FIG. 22 is a diagram showing an example of a determination result image with perimeter monitoring range information indicating that the determination result is unsuitable.

For example, in the case where the image used in the designated platoon information acceptance process is the designated reception image 184C with perimeter monitoring range information, the control device 12 may output the determination result image 186 in which the suitability information is associated with the designated reception image 184C with perimeter monitoring range information, from the output device. This determination result image 186 is referred to as "determination result image 186C with perimeter monitoring range information". FIG. 21 is a diagram showing an example of a determination result image with perimeter monitoring range information indicating that the determination result is suitable. The determination result image 186C with perimeter monitoring range information shown in FIG. 21 is an image outputted in the process of the above-mentioned step S404. In the example shown in FIG. 21, it is visually indicated that the designated platoon is suitable for the platooning travel. On the other hand, FIG. 22 is a diagram showing an example of a determination result image with perimeter monitoring range information indicating that the determination result is unsuitable. The determination result image 186C with perimeter monitoring range information shown in FIG. 22 is an image outputted in the process of the above-mentioned step S402. In the example shown in FIG. 22, the platoon candidate vehicle which is unsuitable for platooning travel and the reason thereof are visually shown.

The display form of the determination result image 186C with perimeter monitoring range information is not limited to the example shown in FIG. 21 or FIG. 22. For example, the determination result image 186C with perimeter monitoring range information is not limited to the expression method of characters, images, line types, colors, display effects, and the like as long as the determination result information and perimeter monitoring range information are included in the image.

According to the formation process, the designator can efficiently designate the designated platoon suitable for the sort running.

4. Platooning Start Process

The designated platoon determined to be suitable by the formation process 302 is stored in the memory 30 as the vehicle group information 310. The platooning process 304 includes a platooning start process of organizing a platoon based on the information of the designated platoon included in the vehicle group information 310 and starting the platooning travel. Hereinafter, a specific example of the platooning start process of the platooning system 100 according to the first embodiment will be described in detail.

4-1. Specific Processing for Platooning Start Process

Figure 23:
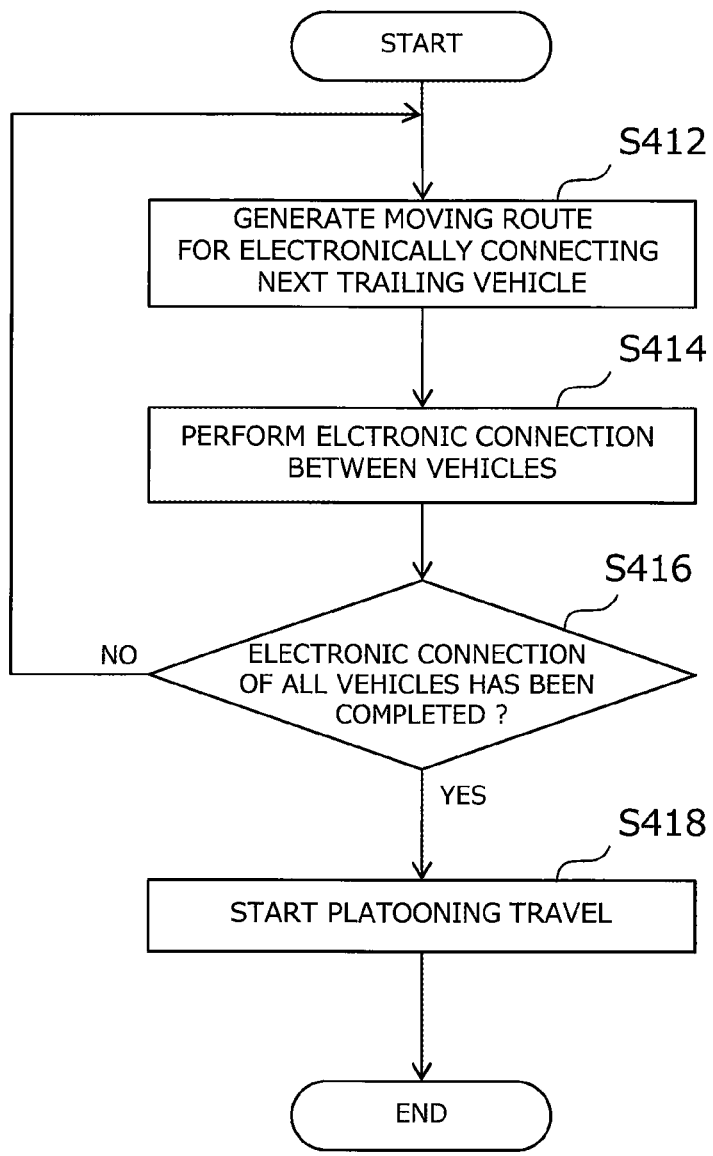
FIG. 23 is a flowchart showing a routine of a platooning start process executed in the platooning system according to the first embodiment.

FIG. 23 is a flowchart showing a routine of a platooning start process executed in the platooning system of the first embodiment. The routine shown in FIG. 23 is executed by the processor 20 of the control device 12 executing the program of the platooning process 304 stored in the memory 30.

In the routine shown in FIG. 23, the control device 12 performs electronic connection between the platoon candidates vehicles constituting the designated platoon based on the information on the designated platoon included in the vehicle group information 310. Specifically, in step S412, the control device 12 generates a moving route of the trailing vehicle which is next electronically connected behind the present last trailing vehicle. Here, the moving route is a route to move to the rear of the last trailing vehicle. Next, in step S414, the control device 12 performs an electronic connection between the present last trailing vehicle and another trailing vehicle. Next, in step S416, the control device 12 determines whether or not the electronic connection of all the vehicles constituting the designated platoon has been completed. As a result, when it is determined that the determination is not satisfied, the control device 12 executes the process of step S412 again. On the other hand, when it is determined that the determination of the step S416 is established, the control device 12 starts the platooning travel of the designated platoon toward the destination in step S418.

5. Platooning End Process

In the platooning process 304, when the vehicle group 2 approaches the arrival area 210 as the destination by the platooning travel, the control device 12 sets the parking mode of each vehicle 1 constituting the designated platoon. This processing is referred to as "parking mode setting process". Then, the control device 12 performs a parking process for parking the platoon vehicle in accordance with the set parking mode. Hereinafter, a specific example of the platooning end process of the platooning system 100 according to the first embodiment will be described in detail.

5-1. Specific Processing for Platooning End Process

Figure 24:
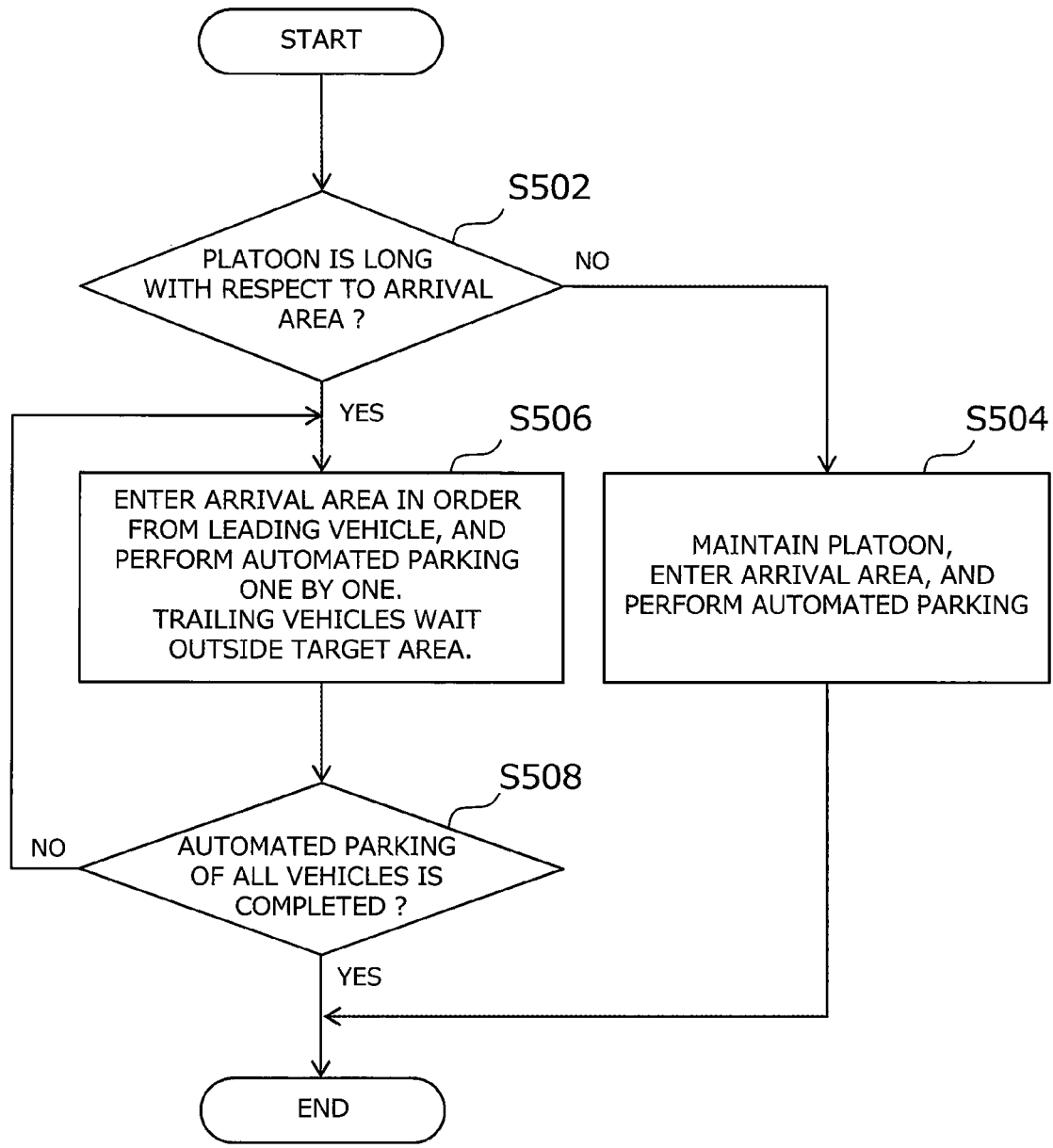
FIG. 24 is a flowchart showing a routine of a platooning end process executed in the platooning system according to the first embodiment.

FIG. 24 is a flowchart showing a routine of a platooning end process executed in the platooning system according to the first embodiment. The routine shown in FIG. 24 is executed by the processor 20 of the control device 12 executing the program of the platooning process 304 stored in the memory 30.

Figure 25:
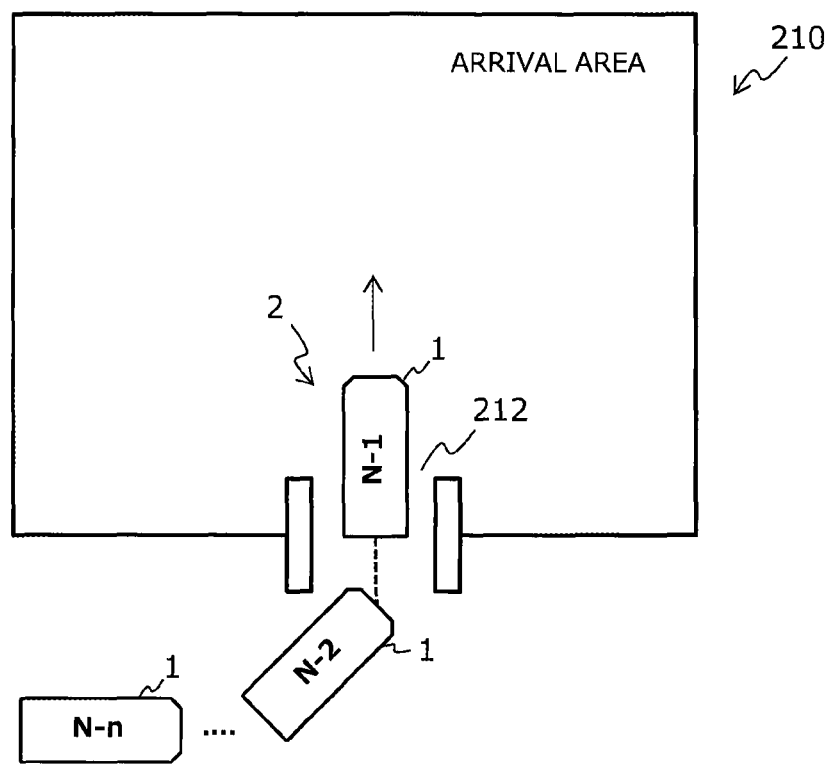
FIG. 25 is a diagram showing a parking mode in which a vehicle group maintains a platoon and enters an arrival area.

In the routine shown in FIG. 24, when the vehicle group 2 approaches the arrival area 210, the control device 12 sets the parking mode of each vehicle 1 constituting the designation platoon and performs parking process. Specifically, the control device 12 determines whether or not the platoon of the vehicle group 2 is long with respect to the arrival area 210 in step S502. If the platoon is long with respect to the arrival area 210, there is a possibility that the vehicle group 2 cannot enter the arrival area 210 in a state in which the platoon is assembled. In this determination, it is determined whether or not the vehicle group 2 can enter the arrival area 210 by the platooning travel. As a result, if the determination is not satisfied, the process proceeds to step S504. In step S504, the control device 12 maintains the platoon and sets a parking mode for entering the arrival area 210 (parking mode setting process). Then, the control device 12 maintains the platoon according to the set parking mode, enters the site from the vehicle entrance/exit 212 of the arrival area 210, and performs automated parking (parking process). FIG. 25 is a diagram showing a parking mode in which a vehicle group maintains a platoon and enters an arrival area. When the process of step S504 is completed, the present routine is terminated.

Figure 26:
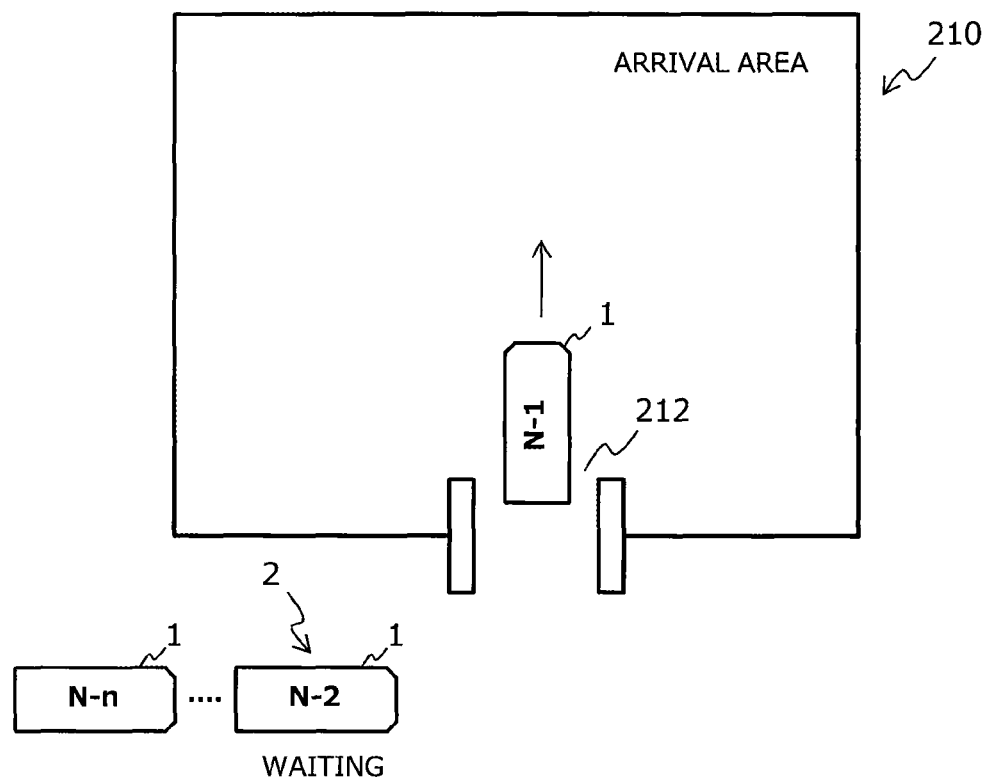
FIG. 26 is a diagram showing a parking mode in which the vehicles of the platoon enter the arrival area one by one.

On the other hand, when the determination of step S502 is accepted, it can be determined that the vehicle group 2 cannot enter the arrival area 210 while maintaining the platoon. In this instance, the process proceeds to step S506. In step S506, the control device 12 sets a parking mode in which the vehicles of the platoon enters the arrival area 210 one by one (parking mode setting process). Then, the control device 12 disconnects the electronic connection in accordance with the set parking mode, enters the arrival area 210 in order from the leading vehicle, and performs automated parking (parking process). FIG. 26 is a diagram showing a parking mode in which the vehicles of the platoon enter the arrival area one by one. As shown in FIG. 26, in the process of step S506, the control device 12 causes the trailing vehicle to wait outside the arrival area 210.

When the process of step S506 is completed, the control device 12 determines whether or not the automated parking of all the vehicles constituting the designated platoon is completed in step S508. As a result, when the determination of step S508 is not established, the control device 12 executes the process of step S506 again. On the other hand, if the determination of step S508 is satisfied, the routine is terminated.

According to such a platooning process, it is possible to smoothly start and end the platooning travel.

6. Modification

The platooning management system 10 according to the first embodiment may adopt a modified form as described below.

The platooning management system 10 may be configured as an in-vehicle system in which part or all of the system is mounted on a vehicle. If the HMI unit 14 of the platooning management system 10 is mounted on the target vehicle 1, the HMI unit 410 included in the target vehicle 1 may realize the function of the HMI unit 14. The target vehicle 1 on which the function of the HMI unit 14 of the platooning management system 10 is mounted is preferably a vehicle on which a driver is on board. As a result, the driver may designate the designated platoon by operating the HMI unit 14 from the inside of the vehicle.

What is claimed is:

1. A platooning management system for organizing a platoon for platooning travel by electronically connecting vehicle-to-vehicle of a plurality of vehicles, the platooning management system comprising:
   a processor to execute a program for organizing the platoon; and
   a memory to store the program,
   wherein the program includes
      a list presentation process for presenting a list including information of vehicles corresponding to platooning travel by electronic concatenation among target vehicles stopped in a target area,
      an accepting process for accepting designation of a platoon candidate vehicle and a platoon order for performing the platooning travel in a state in which the list is presented,
      a determination process for determining whether a designated platoon organized according to the platoon candidate vehicle and the platoon order is suitable for the platooning travel, and
      an output process for outputting a determination result determined by the determination process,
   wherein the determination process includes a perimeter monitoring range identification process for identifying a perimeter monitoring range of the designated platoon monitored by a sensor group mounted on the platoon candidate vehicle, and is configured to determine suitability of the designated platoon based on the perimeter monitoring range, the perimeter monitoring range defined by a visible range of one or more image sensors of the sensor group, the perimeter monitoring range indicating an observable range defined by a two-dimensional area or a three-dimensional spatial volume at least partially surrounding the platoon candidate vehicle.

2. The platooning management system according to claim 1,
   wherein the list presentation process is configured to display an image including the perimeter monitoring range on a display device.

3. The platooning management system according to claim 1,
   wherein the determination process includes a stop position information acquisition process for acquiring stop position information of the target vehicles, and is configured to determine suitability of the designated platoon based on the stop position information.

4. The platooning management system according to claim 3,
   wherein the list presentation process is configured to display an image including the stop position information on a display device.

5. The platooning management system according to claim 1,
   wherein the output process is configured to display an image in which the determination result is associated with an image including the perimeter monitoring range on a display device.

6. The platooning management system according to claim 3,
   wherein the output process is configured to display an image in which the determination result is associated with an image including the stop position information on a display device.

7. The platooning management system according claim 1,
   wherein the program includes
      a parking mode setting process for setting a parking mode of the designated platoon in an arrival area, and
      a parking process for parking the designated platoon according to the parking mode.

8. A platooning management system for organizing a platoon for platooning travel by electronically connecting vehicle-to-vehicle of a plurality of vehicles, the platooning management system comprising a human machine interface unit for organizing the platoon,
   wherein the human machine interface unit includes
      an input device for accepting designation of a platoon candidate vehicle and a platoon order for performing platooning travel, and
      an output device for outputting a suitability result of a designated platoon organized according to the platoon candidate vehicle and the platoon order to the platooning travel,
   wherein the output device is configured to display a list including information of active vehicles corresponding to the platooning travel by electronic connection, among target vehicles stopped in a target area,
   wherein the input device is configured to accept designation of the platoon candidate vehicle and the platoon order, in a state where the list is displayed on the output device, and
   wherein the list is an image including information of a perimeter monitoring range of the designated platoon monitored by a sensor group mounted on the platoon candidate vehicle, the perimeter monitoring range defined by a visible range of one or more image sensors of the sensor group, the perimeter monitoring range indicating an observable range defined by a two-dimensional area or a three-dimensional spatial volume at least partially surrounding the platoon candidate vehicle.

9. The platooning management system according to claim 8,
   wherein the human machine interface unit includes a touch panel in which the input device and the output device are integrally formed.

10. The platooning management system according to claim 8,
    wherein the list is an image including stop position information of the target vehicles.

11. The platooning management system according to claim 8,
    wherein the output device is configured to display an image in which the suitability result is associated with an image including information of a perimeter monitoring range of the designated platoon monitored by a sensor group mounted on the platoon candidate vehicle.

12. The platooning management system according to claim 8,
   wherein the output device is configured to display an image in which the suitability result is associated with an image including stop position information of the platoon candidate vehicle.

13. The platooning management system according to claim 8,
   wherein the human machine interface unit is mounted on a vehicle on which a driver is on board among target vehicles stopped in the target area.

\* \* \* \* \*